(12) United States Patent
Thrash

(10) Patent No.: US 11,932,351 B2
(45) Date of Patent: Mar. 19, 2024

(54) CONICAL BICYCLE CASSETTE SPROCKET STRUCTURE

(71) Applicant: The Hive Global, Inc., Taichung (TW)

(72) Inventor: Greg Thrash, Petaluma, CA (US)

(73) Assignee: The Hive Global, Inc., Taichung (TW)

( * ) Notice: Subject to any disclaimer, the term of this patent is extended or adjusted under 35 U.S.C. 154(b) by 0 days.

(21) Appl. No.: 17/374,841

(22) Filed: Jul. 13, 2021

(65) Prior Publication Data
US 2022/0017180 A1   Jan. 20, 2022

Related U.S. Application Data

(60) Provisional application No. 63/053,424, filed on Jul. 17, 2020.

(51) Int. Cl.
| | | |
|---|---|---|
| *B62M 9/10* | (2006.01) | |
| *B60B 27/02* | (2006.01) | |
| *B60B 27/04* | (2006.01) | |

(52) U.S. Cl.
CPC .............. *B62M 9/10* (2013.01); *B60B 27/023* (2013.01); *B60B 27/04* (2013.01)

(58) Field of Classification Search
CPC ......... B62M 9/10; B60B 27/04; B60B 27/023
USPC ........................................................ 474/160
See application file for complete search history.

(56) References Cited

U.S. PATENT DOCUMENTS

| | | |
|---|---|---|
| 512,729 A | 1/1894 | Lucas et al. |
| 527,384 A | 10/1894 | Davids |
| 527,520 A | 10/1894 | Copeland |
| 547,639 A | 10/1895 | Grubb |
| 575,712 A | 1/1897 | Hamilton |
| 576,548 A | 2/1897 | Cassidy |
| 579,479 A | 3/1897 | Gobbler |
| 590,685 A | 9/1897 | Matthews |
| 595,388 A | 12/1897 | Hanson |
| 598,325 A | 2/1898 | McIntyre |

(Continued)

FOREIGN PATENT DOCUMENTS

| | | |
|---|---|---|
| AT | 397641 B | 5/1994 |
| CN | 2115968 A | 9/1992 |

(Continued)

OTHER PUBLICATIONS

The office action from the Taiwan Application No. 106109159 dated Nov. 26, 2021.

(Continued)

*Primary Examiner* — Gene O Crawford
*Assistant Examiner* — Emily R Kincaid
(74) *Attorney, Agent, or Firm* — Haverstock & Owens, A Law Corporation

(57) ABSTRACT

A conical shaped bicycle cassette has a unitary sprocket assembly. Each annular portion of an individual sprocket is mechanically supported either from a back of the sprocket, in an axial direction toward a bicycle hub or from an inner radial direction toward a centerline axis of the bicycle cassette and hub. The axial support zones and radial support zones are alternated around a circumference of the sprocket so that an entirety of the sprocket is supported in either the axial direction or the radial direction. In this way, the chain driving loads on the cassette are spread throughout the entire cassette and the areas of highly localized stress from the cassette are removed.

29 Claims, 18 Drawing Sheets

(56) References Cited

U.S. PATENT DOCUMENTS

| | | |
|---|---|---|
| 614,900 A | 11/1898 | Seaver |
| 616,167 A | 12/1898 | Walker |
| 620,266 A | 2/1899 | Woodiska |
| 658,400 A | 9/1900 | Roberts |
| 666,679 A | 1/1901 | Kraus |
| 811,799 A | 2/1906 | Seidemann |
| 848,870 A | 4/1907 | Weller |
| 1,070,971 A | 8/1913 | Lowd |
| 1,325,206 A | 12/1919 | Raybon |
| 1,400,131 A | 12/1921 | Adams |
| 1,535,601 A | 4/1925 | Graham |
| 1,636,327 A | 7/1927 | Roe |
| 2,015,430 A | 9/1935 | Matthew |
| 2,024,499 A | 12/1935 | Baron |
| 2,139,176 A | 12/1938 | Sims |
| 2,228,770 A | 1/1941 | Le Tourneau |
| 2,317,070 A | 4/1943 | Le Tourneau |
| 2,567,785 A | 9/1951 | Rieger |
| 2,568,443 A | 9/1951 | Gerner |
| 2,751,797 A | 6/1956 | Pearl |
| 3,184,993 A | 5/1965 | Swenson |
| 3,185,439 A | 5/1965 | Seiuemon et al. |
| 3,303,720 A | 2/1967 | Jaulmes |
| 3,332,297 A | 7/1967 | Morse |
| D208,683 S | 9/1967 | Schreckengost |
| 3,382,734 A | 5/1968 | Hussey |
| 3,416,385 A | 12/1968 | Schenk |
| 3,477,303 A | 11/1969 | Brilando |
| 3,485,113 A | 12/1969 | Adcock |
| 3,592,076 A | 7/1971 | Baginski |
| 3,748,916 A | 7/1973 | Morse |
| 3,760,653 A | 9/1973 | Hagenah |
| 3,785,129 A | 1/1974 | Anthamatten |
| 3,807,255 A | 4/1974 | Baginski |
| 3,811,339 A | 5/1974 | Konzorr |
| 3,869,138 A | 3/1975 | Allison |
| 3,910,136 A | 10/1975 | Juy |
| 3,933,373 A | 1/1976 | Gammelgaard |
| 3,964,343 A | 6/1976 | Lauterbach |
| 3,973,447 A | 8/1976 | Nagano |
| 4,016,357 A | 4/1977 | Abrahamsen |
| 4,037,484 A | 7/1977 | Morse |
| 4,044,621 A | 8/1977 | McGregor, Sr. |
| 4,078,444 A | 3/1978 | Huret |
| 4,089,236 A | 5/1978 | Genzling |
| 4,093,325 A | 6/1978 | Troccaz |
| 4,135,727 A | 1/1979 | Camagnolo |
| 4,237,743 A | 12/1980 | Nagano |
| 4,240,303 A | 12/1980 | Mosley |
| 4,269,084 A | 5/1981 | Okajima |
| 4,298,210 A | 11/1981 | Lotteau |
| 4,302,987 A | 12/1981 | Takeda |
| 4,324,323 A | 4/1982 | Campagnolo |
| 4,330,137 A | 5/1982 | Nagano |
| 4,337,933 A | 7/1982 | Egami |
| 4,377,952 A | 3/1983 | Gamondes |
| 4,380,445 A | 4/1983 | Shimano |
| 4,398,434 A | 8/1983 | Kimura |
| 4,429,448 A | 2/1984 | Butz |
| 4,433,963 A | 2/1984 | Shimano |
| 4,439,172 A | 3/1984 | Segawa |
| 4,441,383 A | 4/1984 | Segawa |
| 4,442,732 A | 4/1984 | Okajima |
| 4,445,289 A | 5/1984 | Beneteau |
| 4,445,397 A | 5/1984 | Shimano |
| 4,472,163 A | 9/1984 | Bottini |
| 4,475,894 A | 10/1984 | Sugino |
| 4,487,424 A | 12/1984 | Ellis |
| 4,488,453 A | 12/1984 | Drugeon |
| 4,498,890 A | 2/1985 | Sutherland |
| 4,506,463 A | 3/1985 | Chassing |
| 4,507,105 A | 3/1985 | Stottmann |
| 4,515,386 A | 5/1985 | Tsujimura |
| 4,523,492 A | 6/1985 | Shimano |
| 4,538,480 A | 9/1985 | Trindle |
| 4,548,422 A | 10/1985 | Michel et al. |
| 4,573,950 A | 3/1986 | Nagano |
| 4,608,878 A | 9/1986 | Shimano |
| 4,632,416 A | 12/1986 | Zelenetz |
| 4,639,240 A | 1/1987 | Liu |
| 4,640,151 A | 2/1987 | Howell |
| 4,646,586 A | 3/1987 | Raposarda |
| 4,662,862 A | 5/1987 | Matson |
| 4,665,767 A | 5/1987 | Lassche |
| 4,686,867 A | 8/1987 | Bernard |
| 4,704,919 A | 11/1987 | Durham |
| 4,735,107 A | 4/1988 | Winkie |
| D298,613 S | 11/1988 | McMurtey |
| 4,789,176 A | 12/1988 | Carrol |
| 4,791,692 A | 12/1988 | Collins |
| 4,803,894 A | 2/1989 | Howell |
| 4,811,626 A | 3/1989 | Bezin |
| 4,815,333 A | 3/1989 | Sampson |
| 4,827,633 A | 5/1989 | Feldstein |
| 4,832,667 A | 5/1989 | Wren |
| 4,838,115 A | 6/1989 | Nagano |
| 4,840,085 A | 6/1989 | Nagano |
| 4,854,924 A | 8/1989 | Nagano |
| 4,856,801 A | 8/1989 | Hollingsworth |
| 4,873,890 A | 10/1989 | Nagano |
| 4,882,946 A | 11/1989 | Beyl |
| 4,893,523 A | 1/1990 | Lennon |
| 4,898,063 A | 2/1990 | Sampson |
| 4,900,050 A | 2/1990 | Bishop et al. |
| 4,905,541 A | 3/1990 | Alan |
| 4,923,324 A | 5/1990 | Favrou |
| 4,928,549 A | 5/1990 | Nagano |
| 4,932,287 A | 6/1990 | Ramos |
| 4,947,708 A | 8/1990 | Lacomb |
| 4,986,949 A | 1/1991 | Trimble |
| 5,002,520 A | 3/1991 | Greenlaw |
| 5,003,841 A | 4/1991 | Nagano |
| 5,014,571 A | 5/1991 | Dapezi |
| 5,018,564 A | 5/1991 | Anglin |
| 5,019,312 A | 5/1991 | Bishop |
| 5,046,382 A | 9/1991 | Steinberg |
| 5,048,369 A | 9/1991 | Chen |
| 5,060,537 A | 10/1991 | Nagano |
| 5,067,930 A | 11/1991 | Morales |
| D323,309 S | 1/1992 | Perry |
| 5,115,692 A | 5/1992 | Nagano |
| 5,121,935 A | 6/1992 | Mathieu et al. |
| 5,125,288 A | 6/1992 | Amiet |
| 5,125,489 A | 6/1992 | Cha |
| 5,179,873 A | 1/1993 | Girvin |
| 5,188,384 A | 2/1993 | van Raemdonck |
| 5,194,051 A | 3/1993 | Nagano |
| 5,195,397 A | 3/1993 | Nagano |
| 5,203,229 A | 4/1993 | Chen |
| 5,207,768 A | 5/1993 | Gluys |
| 5,209,581 A | 5/1993 | Nagano |
| 5,215,322 A | 6/1993 | Enders |
| 5,259,270 A | 11/1993 | Lin |
| 5,320,582 A | 6/1994 | Takeda |
| 5,324,100 A | 6/1994 | James |
| 5,326,331 A | 7/1994 | Hallock, III |
| 5,379,665 A | 1/1995 | Nagano |
| D355,872 S | 2/1995 | Haney |
| 5,419,218 A | 5/1995 | Romano |
| 5,423,233 A | 6/1995 | Peyre |
| 5,435,869 A | 7/1995 | Christensen |
| 5,451,071 A | 9/1995 | Pong et al. |
| 5,460,576 A | 10/1995 | Barnett |
| 5,496,222 A | 3/1996 | Kojima |
| 5,497,680 A | 3/1996 | Nagano |
| 5,503,600 A | 4/1996 | Berecz |
| 5,505,111 A | 4/1996 | Nagano |
| 5,522,282 A | 6/1996 | Nagano |
| 5,522,611 A | 6/1996 | Schmidt |
| 5,540,118 A | 7/1996 | Calendrille, Jr. |
| 5,544,907 A | 8/1996 | Lin et al. |
| 5,549,396 A | 8/1996 | Chiang |
| 5,620,384 A | 4/1997 | Kojima |
| 5,626,060 A | 5/1997 | Lin |

(56) References Cited

U.S. PATENT DOCUMENTS

| | | |
|---|---|---|
| 5,632,940 A | 5/1997 | Whatley |
| 5,644,953 A | 7/1997 | Leng |
| 5,676,616 A | 10/1997 | Hara |
| 5,679,084 A | 10/1997 | Daniels, III |
| 5,687,619 A | 11/1997 | Bryne |
| 5,725,450 A | 3/1998 | Huskey |
| 5,727,429 A | 3/1998 | Ueda |
| 5,728,018 A | 3/1998 | Terada |
| 5,765,450 A | 6/1998 | Kruger |
| 5,771,757 A | 6/1998 | Hanamura |
| 5,782,714 A | 7/1998 | Osgood |
| 5,788,593 A | 8/1998 | Tiong |
| 5,791,202 A | 8/1998 | Karsdon |
| 5,803,476 A | 9/1998 | Olson et al. |
| 5,806,379 A | 9/1998 | Nagano |
| 5,809,844 A | 9/1998 | Durham |
| 5,816,377 A | 10/1998 | Nakamura |
| 5,819,599 A | 10/1998 | Yamanaka |
| 5,846,148 A | 12/1998 | Fuji |
| 5,893,299 A | 4/1999 | Yamanaka |
| 5,927,155 A | 7/1999 | Jackson |
| 5,935,034 A | 8/1999 | Campagnolo |
| 5,941,135 A | 8/1999 | Schlanger |
| 5,943,795 A | 8/1999 | Ueda |
| 5,954,604 A | 9/1999 | Nakamura |
| 6,003,889 A | 12/1999 | Shalom |
| 6,014,913 A | 1/2000 | Masahiro |
| 6,014,914 A | 1/2000 | Ueda |
| 6,039,665 A | 3/2000 | Nakamura |
| 6,058,803 A | 5/2000 | Yamanaka |
| 6,059,171 A | 5/2000 | Yamanaka et al. |
| 6,059,378 A | 5/2000 | Dougherty |
| 6,060,982 A | 5/2000 | Holtrop |
| 6,083,132 A | 7/2000 | Walker |
| 6,095,691 A | 8/2000 | Chiang |
| 6,102,821 A | 8/2000 | Nakamura |
| 6,117,032 A | 9/2000 | Nankou |
| 6,165,092 A | 12/2000 | Bramham |
| 6,202,506 B1 | 3/2001 | Storck et al. |
| 6,203,459 B1 | 3/2001 | Calendrille, Jr. |
| 6,264,575 B1 | 7/2001 | Lim |
| 6,266,990 B1 | 7/2001 | Shook et al. |
| 6,305,243 B1 | 10/2001 | Chiang |
| 6,314,834 B1 | 11/2001 | Smith et al. |
| 6,332,853 B1 | 12/2001 | Bowman |
| 6,354,973 B1 | 3/2002 | Barnett |
| 6,382,381 B1 | 5/2002 | Okajima et al. |
| 6,416,434 B1 | 7/2002 | Calendrille, Jr. |
| 6,428,437 B1 | 8/2002 | Schlanger |
| 6,488,603 B2 | 12/2002 | Lim et al. |
| 6,490,948 B2 | 12/2002 | Tanaka |
| 6,520,048 B2 | 2/2003 | Chen |
| 6,533,690 B2 | 3/2003 | Barnett |
| 6,564,675 B1 | 5/2003 | Jiang |
| 6,612,201 B1 | 9/2003 | Chen |
| 6,637,292 B2 | 10/2003 | Chu |
| 6,647,826 B2 | 11/2003 | Okajima |
| 6,725,742 B2 | 4/2004 | Bremer |
| 6,729,204 B1 | 5/2004 | Chen |
| 6,805,373 B2 | 10/2004 | Singenberger et al. |
| 6,848,700 B1 | 2/2005 | Fritschen |
| 6,988,427 B2 | 1/2006 | Yamanaka |
| 7,011,592 B2 | 3/2006 | Shahana et al. |
| 7,013,754 B2 | 3/2006 | Milanowski |
| 7,024,961 B2 | 4/2006 | Hsiao |
| D522,414 S | 6/2006 | Chen |
| 7,059,983 B2 | 6/2006 | Heim |
| 7,066,856 B1 | 6/2006 | Rogers |
| 7,066,857 B1 | 6/2006 | DeRosa |
| D524,195 S | 7/2006 | Neal |
| 7,108,428 B2 | 9/2006 | Ason |
| 7,118,505 B2 | 10/2006 | Lee |
| 7,131,656 B2 | 11/2006 | Valle |
| 7,174,807 B2 | 2/2007 | Bryne |
| 7,240,587 B2 | 7/2007 | Plassiard |
| 7,263,914 B2 | 9/2007 | Ording et al. |
| 7,334,500 B2 | 2/2008 | Tseng |
| 7,523,685 B2 | 4/2009 | French |
| 7,562,604 B2 | 7/2009 | Fukui |
| 7,610,832 B2 | 11/2009 | Dal Pra' |
| 7,650,817 B2 | 1/2010 | Shiraishi et al. |
| 7,753,157 B2 | 7/2010 | Woods |
| 7,770,492 B2 | 8/2010 | French |
| 7,775,128 B2 | 8/2010 | Roessingh et al. |
| 7,886,947 B2 | 2/2011 | Campagnolo |
| 7,931,553 B2 | 4/2011 | Tokuyama |
| 7,959,529 B2 | 6/2011 | Braedt |
| 8,024,993 B2 | 9/2011 | Dal Pra' et al. |
| 8,025,304 B2 | 9/2011 | Smith |
| 8,066,293 B2 | 11/2011 | Meggiolan |
| 8,197,371 B2 | 6/2012 | D'Aluisio |
| 8,235,849 B2 | 8/2012 | Carnston et al. |
| 8,267,417 B1 | 9/2012 | Yamanaka |
| 8,302,504 B2 | 11/2012 | Dal Pra' |
| 8,393,794 B1 | 3/2013 | Shiraishi |
| 8,413,769 B2 | 4/2013 | Thrash |
| 8,491,429 B2 | 7/2013 | Cranston et al. |
| 8,561,500 B2 | 10/2013 | D'Aluisio |
| 8,578,816 B2 | 11/2013 | Lin |
| 8,590,421 B2 | 11/2013 | Meggiolan et al. |
| 8,616,084 B2 | 12/2013 | Meggiolan |
| 8,641,151 B2 | 2/2014 | Kamada |
| 8,663,044 B2 * | 3/2014 | Lin .................. B62M 9/10 |
| | | 474/160 |
| 8,689,662 B2 | 4/2014 | Pasqua et al. |
| 8,707,823 B2 | 4/2014 | Dal Pra' |
| 8,770,061 B2 | 7/2014 | Meggiolan et al. |
| 8,820,192 B2 | 9/2014 | Staples et al. |
| 8,834,309 B2 | 9/2014 | Braedt |
| 8,863,616 B2 | 10/2014 | Ciavatta et al. |
| 8,888,629 B2 | 11/2014 | Ji |
| 8,911,314 B2 | 12/2014 | Braedt |
| 8,979,685 B2 | 3/2015 | Weagle |
| 9,003,921 B2 | 4/2015 | Weagle |
| 9,011,282 B2 | 4/2015 | Staples |
| 9,260,158 B2 * | 2/2016 | Braedt ................ B62M 9/10 |
| 9,458,871 B2 | 10/2016 | Ishizaki |
| 9,517,811 B1 | 12/2016 | Shiraishi |
| 10,160,030 B2 | 12/2018 | Earle et al. |
| 10,221,887 B2 | 3/2019 | Dubois et al. |
| 10,259,526 B2 | 4/2019 | Hsieh |
| 10,260,568 B2 | 4/2019 | Chen |
| 10,480,571 B2 | 11/2019 | Dubois et al. |
| 10,562,588 B2 | 2/2020 | Thrash et al. |
| 11,142,280 B2 | 10/2021 | Dubois et al. |
| 2001/0049976 A1 | 12/2001 | Dodman |
| 2002/0028719 A1 | 3/2002 | Yamanaka |
| 2002/0160869 A1 | 10/2002 | Barnett |
| 2002/0170382 A1 | 11/2002 | Yang |
| 2002/0194951 A1 | 12/2002 | Lowe |
| 2003/0029271 A1 | 2/2003 | Shuman |
| 2003/0041689 A1 | 3/2003 | Chu |
| 2003/0051576 A1 | 3/2003 | Muraoka |
| 2003/0064844 A1 | 4/2003 | Lin |
| 2003/0171180 A1 | 9/2003 | Shahana et al. |
| 2003/0183036 A1 | 10/2003 | Chou |
| 2003/0197346 A1 | 10/2003 | Singenberger et al. |
| 2004/0009835 A1 | 1/2004 | Heim |
| 2004/0037628 A1 | 2/2004 | Meggiolan |
| 2004/0162172 A1 | 8/2004 | Yamanaka |
| 2004/0182197 A1 | 9/2004 | Chiang |
| 2004/0187635 A1 | 9/2004 | Bryne |
| 2004/0200314 A1 | 10/2004 | Hermansen et al. |
| 2004/0211289 A1 | 10/2004 | Chiang et al. |
| 2004/0254038 A1 | 12/2004 | Chamberlain |
| 2005/0005729 A1 | 1/2005 | Chen |
| 2005/0012298 A1 | 1/2005 | Dal Pra et al. |
| 2005/0016323 A1 | 1/2005 | Dal Pra' |
| 2005/0022625 A1 | 2/2005 | Nonoshita |
| 2005/0032596 A1 | 2/2005 | Nonoshita et al. |
| 2005/0035571 A1 | 2/2005 | Huck |
| 2005/0081678 A1 | 4/2005 | Smith et al. |
| 2005/0081679 A1 | 4/2005 | Chen |
| 2005/0090349 A1 | 4/2005 | Lee |

(56) References Cited

U.S. PATENT DOCUMENTS

| | | |
|---|---|---|
| 2005/0145061 A1 | 7/2005 | Ording et al. |
| 2005/0178236 A1 | 8/2005 | Crozet et al. |
| 2005/0199092 A1 | 9/2005 | Feltrin et al. |
| 2005/0217417 A1 | 10/2005 | Uchida et al. |
| 2005/0252337 A1 | 11/2005 | Chen |
| 2005/0284253 A1 | 12/2005 | Hervig |
| 2006/0029317 A1 | 2/2006 | Yamamoto |
| 2006/0063624 A1 | 3/2006 | Voss |
| 2006/0066074 A1 | 3/2006 | Turner |
| 2006/0075846 A1 | 4/2006 | Valle |
| 2006/0081088 A1 | 4/2006 | Muraoka |
| 2006/0117905 A1 | 6/2006 | Yamanaka |
| 2006/0169098 A1 | 8/2006 | Valle |
| 2006/0199690 A1 | 9/2006 | Gardner |
| 2006/0236809 A1 | 10/2006 | Bryne |
| 2006/0258499 A1 | 11/2006 | Kamada |
| 2006/0266154 A1 | 11/2006 | Hermansen |
| 2006/0288819 A1 | 12/2006 | Dal Pra' et al. |
| 2007/0034043 A1 | 2/2007 | Feltin |
| 2007/0049436 A1 | 3/2007 | Kamada |
| 2007/0062328 A1 | 3/2007 | Shiraishi |
| 2007/0134456 A1 | 6/2007 | Fritschen |
| 2007/0137426 A1 | 6/2007 | Meggiolan et al. |
| 2007/0137432 A1 | 6/2007 | Chen |
| 2007/0182122 A1 | 8/2007 | Smith |
| 2007/0199403 A1 | 8/2007 | Ciavatta et al. |
| 2007/0204720 A1 | 9/2007 | Poyzer |
| 2007/0204722 A1 | 9/2007 | Dal Pra |
| 2007/0207631 A1 | 9/2007 | Meggiolan et al. |
| 2007/0222172 A1 | 9/2007 | Chen |
| 2007/0235986 A1 | 10/2007 | Weagle |
| 2007/0241530 A1 | 10/2007 | Nonoshita |
| 2007/0254758 A1 | 11/2007 | Chen |
| 2007/0283781 A1 | 12/2007 | Meggiolan |
| 2007/0284782 A1 | 12/2007 | Dal Pra' |
| 2007/0289406 A1 | 12/2007 | French |
| 2007/0289407 A1 | 12/2007 | French |
| 2008/0004143 A1 | 1/2008 | Kanehisa |
| 2008/0005905 A1 | 1/2008 | Valle et al. |
| 2008/0058144 A1 | 3/2008 | Oseto et al. |
| 2008/0152460 A1 | 6/2008 | Natanabe |
| 2008/0224440 A1 | 9/2008 | Masuda et al. |
| 2008/0231014 A1 | 9/2008 | Braedt |
| 2008/0234082 A1 | 9/2008 | Braedt |
| 2008/0272572 A1 | 11/2008 | Tsai |
| 2008/0289927 A1 | 11/2008 | Ji |
| 2008/0307652 A1 | 12/2008 | Chiang |
| 2008/0314193 A1 | 12/2008 | Meggiolan |
| 2009/0042682 A1 | 2/2009 | Dal Pra |
| 2009/0056495 A1 | 3/2009 | Bischoff et al. |
| 2009/0056496 A1 | 3/2009 | Dodman et al. |
| 2009/0078081 A1 | 3/2009 | French |
| 2009/0095122 A1 | 4/2009 | Weagle |
| 2009/0145262 A1 | 6/2009 | Pasqua et al. |
| 2009/0151509 A1 | 6/2009 | French |
| 2009/0191996 A1 | 7/2009 | D'Aluisio |
| 2009/0236777 A1 | 9/2009 | Chiang |
| 2009/0243250 A1 | 10/2009 | Chiang |
| 2009/0261553 A1 | 10/2009 | Meggiolan |
| 2010/0009794 A1 | 1/2010 | Chiang |
| 2010/0058889 A1 | 3/2010 | Dal Pra |
| 2010/0064845 A1 | 3/2010 | French |
| 2010/0099530 A1 | 4/2010 | Chiang et al. |
| 2010/0229675 A1 | 9/2010 | Dodman et al. |
| 2010/0236356 A1 | 9/2010 | Dodman |
| 2010/0275724 A1 | 11/2010 | Staples et al. |
| 2010/0295265 A1 | 11/2010 | Burdick |
| 2011/0011202 A1 | 1/2011 | Lin |
| 2011/0105263 A1 | 5/2011 | Braedt |
| 2011/0130233 A1 | 6/2011 | Tokuyama |
| 2011/0140390 A1 | 6/2011 | Kuroiwa et al. |
| 2011/0204201 A1 | 8/2011 | Kodama |
| 2011/0290069 A1 | 12/2011 | Lin |
| 2012/0067675 A1 | 3/2012 | Thrash |
| 2012/0119565 A1 | 5/2012 | Kamada |
| 2012/0225745 A1 | 9/2012 | Oishi |
| 2012/0260767 A1 | 10/2012 | D'Aluisio |
| 2012/0302384 A1 | 11/2012 | Braedt |
| 2013/0053195 A1 | 2/2013 | Emura et al. |
| 2013/0053196 A1 | 2/2013 | Emura et al. |
| 2013/0068066 A1 | 3/2013 | Staples et al. |
| 2013/0114999 A1 | 5/2013 | Ostling |
| 2013/0225343 A1 | 8/2013 | Spahr et al. |
| 2014/0157951 A1 | 6/2014 | Dubois et al. |
| 2014/0179474 A1 | 6/2014 | Florczyk |
| 2014/0345419 A1 | 11/2014 | Staples et al. |
| 2015/0020621 A1 | 1/2015 | Kawakami |
| 2015/0024884 A1* | 1/2015 | Braedt ............... F16H 9/24 |
| | | 474/78 |
| 2015/0210353 A1 | 7/2015 | Tokuyama et al. |
| 2016/0167737 A1 | 6/2016 | Tokuyama |
| 2016/0176447 A1 | 6/2016 | Bernardele |
| 2016/0236749 A1 | 8/2016 | Cody |
| 2016/0272002 A1* | 9/2016 | Earle ................. B60B 1/041 |
| 2017/0057598 A1* | 3/2017 | Thrash ............... B62M 9/10 |
| 2017/0101071 A1 | 4/2017 | Assmann |
| 2017/0274960 A1 | 9/2017 | Dubois et al. |
| 2017/0314665 A1 | 11/2017 | Garcia |
| 2018/0022415 A1 | 1/2018 | Oishi |
| 2018/0148126 A1 | 5/2018 | Tetsuka |
| 2018/0170479 A1 | 6/2018 | Furuya |
| 2018/0257742 A1 | 9/2018 | Chen |
| 2018/0297664 A1 | 10/2018 | Fukumori |
| 2018/0334212 A1 | 11/2018 | Bowers |
| 2018/0346064 A1 | 12/2018 | Fijita |
| 2019/0054765 A1* | 2/2019 | Thrash ............... B60B 27/047 |
| 2019/0093749 A1* | 3/2019 | Bisarello ............. F16H 55/30 |
| 2019/0154083 A1 | 5/2019 | Dubois et al. |
| 2019/0233051 A1 | 8/2019 | Carrasco Vergara |
| 2019/0241233 A1 | 8/2019 | Tavares Miranda |
| 2020/0140034 A1 | 5/2020 | Thrash et al. |
| 2020/0354016 A1 | 11/2020 | Di Serio |
| 2021/0094642 A1 | 4/2021 | Dubois et al. |
| 2021/0171153 A1 | 6/2021 | Nichols |

FOREIGN PATENT DOCUMENTS

| | | |
|---|---|---|
| CN | 1080902 A | 1/1994 |
| CN | 2169593 A | 6/1994 |
| CN | 2170254 Y | 6/1994 |
| CN | 2183329 A | 11/1994 |
| CN | 2188541 Y | 2/1995 |
| CN | 2206250 Y | 8/1995 |
| CN | 2210849 Y | 10/1995 |
| CN | 1112068 A | 11/1995 |
| CN | 2277928 Y | 4/1998 |
| CN | 2279303 A | 4/1998 |
| CN | 1186751 A | 7/1998 |
| CN | 2409135 Y | 12/2000 |
| CN | 2409136 Y | 12/2000 |
| CN | 2428396 Y | 5/2001 |
| CN | 2434218 Y | 6/2001 |
| CN | 1330015 A | 1/2002 |
| CN | 2470233 Y | 1/2002 |
| CN | 2478916 Y | 2/2002 |
| CN | 1342562 A | 4/2002 |
| CN | 2509074 Y | 9/2002 |
| CN | 1439567 A | 9/2003 |
| CN | 1453179 A | 11/2003 |
| CN | 1463881 A | 12/2003 |
| CN | 2683516 Y | 3/2005 |
| CN | 1663872 A | 9/2005 |
| CN | 2749776 Y | 1/2006 |
| CN | 2782543 Y | 5/2006 |
| CN | 2806294 Y | 8/2006 |
| CN | 1864888 A | 11/2006 |
| CN | 1907802 A | 2/2007 |
| CN | 1927649 A | 3/2007 |
| CN | 101054105 A | 10/2007 |
| CN | 200995764 Y | 12/2007 |
| CN | 100379506 C | 4/2008 |
| CN | 201179942 Y | 1/2009 |
| CN | 201712753 U | 1/2011 |
| CN | 201863981 U | 6/2011 |

(56) References Cited

FOREIGN PATENT DOCUMENTS

| | | |
|---|---|---|
| CN | 102372065 A | 3/2012 |
| CN | 103129585 A | 3/2012 |
| CN | 202670040 U | 1/2013 |
| CN | 202827970 U | 3/2013 |
| CN | 203078709 U | 7/2013 |
| CN | 203111435 U | 8/2013 |
| CN | 103448859 A | 12/2013 |
| CN | 203410583 U | 1/2014 |
| CN | 203593074 U | 5/2014 |
| CN | 105564545 A | 5/2016 |
| CN | 2016800500067 | 5/2021 |
| DE | 2655447 A1 | 6/1977 |
| DE | 3017771 A1 | 11/1981 |
| DE | 4002574 A1 | 1/1991 |
| DE | 9408910.8 U1 | 9/1994 |
| DE | 29600548 U1 | 4/1996 |
| DE | 19601125 A1 | 7/1997 |
| DE | 29623671 U1 | 4/1999 |
| DE | 19751879 A1 | 5/1999 |
| DE | 19755950 A1 | 6/1999 |
| DE | 10032778 A1 | 1/2002 |
| DE | 20116764 U1 | 1/2002 |
| DE | 10342638 A1 | 7/2005 |
| DE | 102006015582 A1 | 10/2007 |
| DE | 202008004243 U1 | 7/2008 |
| DE | 102007028897 A1 | 1/2009 |
| DE | 102009006101 A1 | 7/2009 |
| DE | 102016002706 A1 | 9/2017 |
| DE | 10201621865 A1 | 12/2017 |
| EP | 0 012 568 A1 | 6/1980 |
| EP | 0510371 A1 | 10/1992 |
| EP | 0663334 A1 | 7/1995 |
| EP | 0765802 A2 | 4/1997 |
| EP | 0765802 A3 | 4/1997 |
| EP | 0766017 A1 | 4/1997 |
| EP | 0898542 B1 | 5/1997 |
| EP | 0849153 B1 | 12/1997 |
| EP | 0834450 A1 | 4/1998 |
| EP | 0849154 A2 | 6/1998 |
| EP | 0849155 A2 | 6/1998 |
| EP | 0765802 B1 | 7/1999 |
| EP | 1043221 A2 | 10/2000 |
| EP | 1074462 A2 | 2/2001 |
| EP | 1270393 B1 | 1/2003 |
| EP | 1281609 B1 | 2/2003 |
| EP | 1378430 A1 | 1/2004 |
| EP | 1378433 A1 | 1/2004 |
| EP | 1407962 A1 | 4/2004 |
| EP | 1419961 A1 | 5/2004 |
| EP | 1422134 A2 | 5/2004 |
| EP | 1439117 A2 | 7/2004 |
| EP | 1439118 A2 | 7/2004 |
| EP | 1616781 A1 | 1/2006 |
| EP | 1688345 A2 | 8/2006 |
| EP | 1792821 A1 | 6/2007 |
| EP | 1818251 A1 | 8/2007 |
| EP | 1964769 A2 | 9/2008 |
| EP | 1964769 A3 | 9/2008 |
| EP | 1 995 166 A2 | 11/2008 |
| EP | 2022713 A2 | 2/2009 |
| EP | 2042422 A2 | 4/2009 |
| EP | 2045181 A1 | 4/2009 |
| EP | 2048075 A2 | 4/2009 |
| EP | 2165927 A1 | 3/2010 |
| EP | 1486413 B1 | 4/2010 |
| EP | 2441656 A1 | 4/2011 |
| EP | 1818252 B1 | 9/2011 |
| EP | 1820726 B1 | 9/2011 |
| EP | 2311718 B1 | 10/2011 |
| EP | 2412620 A1 | 2/2012 |
| EP | 1669285 B1 | 4/2012 |
| EP | 1486412 B1 | 5/2014 |
| EP | 1342657 B2 | 10/2014 |
| EP | 3 109 062 A1 | 12/2015 |
| FR | 1027817 | 5/1953 |
| FR | 1384356 | 2/1975 |
| FR | 2588236 | 10/1986 |
| FR | 2612870 | 3/1988 |
| FR | 2780698 | 1/2000 |
| GB | 1031337 | 6/1966 |
| GB | 1281731 | 7/1972 |
| GB | 1361394 | 7/1974 |
| GB | 1431308 | 4/1976 |
| GB | 2177628 A | 1/1987 |
| GB | 2225296 A | 5/1990 |
| GB | 2289507 A | 11/1995 |
| JP | 5412663 | 1/1979 |
| JP | 59165293 | 6/1984 |
| JP | 526785 | 4/1993 |
| JP | 1995-002157 | 1/1995 |
| JP | 10181669 A | 7/1998 |
| JP | 3196695 | 6/2001 |
| JP | 3248675 | 11/2001 |
| JP | 3108527 | 9/2005 |
| JP | 2007-223586 | 9/2007 |
| JP | 2008189254 A | 8/2008 |
| JP | 2009-12766 | 1/2009 |
| JP | 2009293677 A | 12/2009 |
| JP | 2011-93526 | 5/2011 |
| JP | 2012-171419 | 9/2012 |
| JP | 2017035926 A | 2/2017 |
| JP | 2019142351 A | 8/2019 |
| JP | 2020199878 A | 12/2020 |
| KR | 10-2011-0075299 | 7/2011 |
| KR | 10-2012-0111687 | 10/2012 |
| KR | 10-1346783 | 12/2013 |
| NL | 1015666 | 1/2001 |
| NL | 2005745 | 5/2012 |
| NZ | 598054 | 5/2013 |
| SK | 1032-95 | 2/1996 |
| SK | 280106 | 6/1999 |
| TW | 448114 | 6/1989 |
| TW | 461866 | 6/1989 |
| TW | 500679 | 1/1990 |
| TW | 498039 | 7/1990 |
| TW | 499380 | 10/1990 |
| TW | 548158 | 10/1990 |
| TW | 527254 | 5/1991 |
| TW | 200800717 | 6/1995 |
| TW | I288100 | 6/1995 |
| TW | M324029 | 3/1996 |
| TW | 200846243 | 5/1996 |
| TW | I363725 | 5/1996 |
| TW | 284731 | 9/1996 |
| TW | 200922834 | 11/1996 |
| TW | M337531 | 11/1996 |
| TW | 200932621 | 8/1998 |
| TW | 568044 | 12/2003 |
| TW | M264208 | 5/2005 |
| TW | I275525 | 12/2005 |
| TW | 201026555 | 7/2010 |
| TW | 201029769 | 8/2010 |
| TW | M386236 | 8/2010 |
| TW | I351327 | 11/2011 |
| TW | 201204597 | 2/2012 |
| TW | 201242833 A | 11/2012 |
| TW | M458370 U1 | 8/2013 |
| TW | I411554 | 10/2013 |
| TW | I411555 | 10/2013 |
| TW | 201422482 A | 6/2014 |
| TW | 201507920 | 3/2015 |
| TW | M576558 | 4/2019 |
| TW | M576558 U | 4/2019 |
| TW | I708709 B | 11/2020 |
| TW | M605175 | 12/2020 |
| TW | M605175 U | 12/2020 |
| TW | I291428 B | 12/2021 |
| TW | I794653 | 3/2023 |
| WO | 89/08039 | 8/1989 |
| WO | 96/03306 | 2/1996 |
| WO | 99/54193 | 10/1999 |
| WO | 01/72578 A1 | 10/2001 |
| WO | 02/32751 A2 | 4/2002 |
| WO | 03/000543 A1 | 1/2003 |

(56) References Cited

FOREIGN PATENT DOCUMENTS

| WO | 2004/080786 | A2 | 9/2004 |
|---|---|---|---|
| WO | 2004/094218 | A2 | 11/2004 |
| WO | 2012/065256 | A1 | 5/2012 |
| WO | 2012/069389 | A1 | 5/2012 |
| WO | 2017/040047 | A1 | 3/2017 |
| WO | 2017040047 | A1 | 3/2017 |
| WO | 2017165226 | A1 | 9/2017 |
| WO | 2019040340 | A1 | 2/2019 |
| WO | 2022015790 | A1 | 1/2022 |

OTHER PUBLICATIONS

EP Official Letter dated Mar. 4, 2022 in European Application No. 16 842 566.8-1009.
Office Action dated Mar. 14, 2022 in Chinese Application No. 201880064395.8.
The Second Office Action dated Oct. 22, 2021 from the Chinese Patent Application No. 201880064395.8.
The International Search Report with Written Opinion dated Nov. 10, 2021, from the PCT Patent Application No. PCT/US2021/041529.
The Examination Notification dated Jun. 28, 2022 for Taiwanese Application No. 107129023.
International Search Report, dated Jun. 9, 2022, for International Application No. PCT/US22/21360.
The Third Party Observation dated Oct. 5, 2021 from the Taiwanese Patent Application No. 109133450.
Mountain Cycle Catalog 2000, www.MountainCycle.com.
Mountain Bike Action Magazine, Oct. 2000, pp. 38-40, www.mbaction.com.
Mountain Cycle Shockwave—Photos.
Mountain Bike Action Magazine 2000, p. 138, www.mbaction.com.
Mountain Cycle Universal Chainguide Instructions, www.mountaincycle.com.
2001 Gizmo Installation Instructions, web.archive.org/web/20011025172447/http://mrdirt.com/gizmo/page4.htm.
Mr.Dirt Gizmo Pictures.
2006 Race Face Interbike(Trade Show)Booth, www.bikemagic.com.
Raceface Diabolous Chainguide Instructions.
Decline Magazine, Issue 20, Article "Its the New Style", Jan. Feb. 2006.
Diabolus Chainguide actual Product Photos.
International Search Report from PCT/US2017/023016.
The Taiwanese Office Action dated Jun. 29, 2020 for the Taiwanese Patent Application No. 105126399.
The Taiwanese Examination Notification dated Jul. 31, 2020 for the Taiwanese Patent Application No. 106109159.
The European Search Report dated Apr. 1, 2019 for the European Patent Application No. 106842566.8.
The International Search Report and Written Opinion dated Nov. 9, 2018 for the International Application No. PCT/US2018/46952.
The European Search Report dated Jun. 13, 2019 for the European Patent Application No. 17 77 0865.
Machine translation of DE 19751879 obtained on Dec. 6, 2018.
The Chinese Office Action dated Apr. 29, 2020 for the Chinese Patent Application No. 2016800500067.
The Taiwanese Office Action dated Jan. 9, 2020 for the Taiwanese Patent Application No. 105126339.
The Chinese Office Action dated Feb. 3, 2020 for the Chinese Patent Application No. 201780017990.01.
The International Preliminary Report on Patentability for the PCT Application : PCT/US2017/023016.
The International Preliminary Report for the PCT Application : PCT/US2018/046952 dated Mar. 5, 2020.
The European Office Action dated Mar. 5, 2020 for the European Patent Application No. 16 842 566.8.
The Taiwanese Office Action dated Jun. 29, 2020 for the Taiwan Patent Application No. 105126399.
The Taiwanese Examination Notification dated Jul. 31, 2020 for the Taiwan Patent Application No. 106109159.
The Second Office Action dated Sep. 14, 2020 for the Taiwan Patent Application No. 201780017990.1.
The Official Letter dated Dec. 1, 2020 from the European Patent Application No. 16842533.8.
The Notice to Grant dated Feb. 19, 2021 from the Chinese Patent Application No. 201680050006.7.
The Chinese Notice of Examination dated Mar. 1, 2021 from the Chinese Patent Application No. 201880064395.8.
The European Search Report dated Mar. 16, 2021 for the European Patent Application No. EP 18 84 8212.
The Chinese Office Action dated Mar. 30, 2021 for the Chinese Application No. 201780017990.01.
Invention Patent Decision dated Oct. 24, 2022 of the Intellectual Property Office of the Ministry of Economic Affairs in Taiwan Application No. 109133450.
The Notice of Allowance dated Nov. 15, 2021 from the Chinese Patent Application No. 201780017990.1.
The Official Letter dated Jul. 5, 2021 from the Taiwanese Patent Application No. 109133450.
The Official Letter dated Jul. 28, 2021 from the Chinese Patent Application No. 201780017990.1.
The Official Letter dated Oct. 6, 2022 for European Application No. 17770865.8.
The office action from the Taiwan Application No. 109133450 dated Jan. 5, 2022.
Real Designs CNC Cassette piece.
3668 effetti.jpg.
3671 efetti.jpg.
CTC10-rear.jpg.
Edco Monoblock 31.jpg.
Freewheel039_36A12-38 w splined interface.jpg.
freewheelProCompel3_IMG_1826.jpg.
P1000874 real cassette.jpg.
Real designs cassette.jpg.
sram_rednew-cassette.143.jpg.
tioga.jpg.
The Machine Translation of JP 2019142351.
The International Preliminary Report on Patentability for PCT Application No. PCT/US2021/041529.
The Official Letter dated Apr. 5, 2023 from the European Patent Application No. EP18848212.9.
The Request for Patent Invalidation dated Jun. 26, 2023 from the Taiwanese Patent Application No. 109133450.
The Notice of Allowance dated Sep. 14, 2023 from the Taiwanese Patent Application No. 107129023.
Machine translation of DE 10 2006 015 582.
The International Preliminary Report dated Oct. 5, 2023 from the International Patent Application No. PCT/US2022/021360.

\* cited by examiner

CONICAL BICYCLE CASSETTE SPROCKET STRUCTURE

RELATED APPLICATIONS

This patent application claims priority under 35 U.S.C. 119(e) of the U.S. Provisional Patent Application No. 63/053,424, filed Jul. 17, 2021, entitled "CONICAL BICYCLE CASSETTE SPROCKET STRUCTURE," which is hereby incorporated by reference.

FIELD OF THE INVENTION

The present invention is generally directed to a conical shaped unitary sprocket structure for a bicycle cassette. More specifically, the present invention is directed to a conical shaped unitary sprocket structure for a bicycle cassette with a plurality of individual sprockets connected to form the bicycle cassette.

BACKGROUND OF THE INVENTION

Unitary sprocket assemblies with a conical shape that are used to support a plurality of sprocket assemblies of the cassette are often machined from a single piece of material. Holes and/or windows are able to be machined into the sprocket assemblies to reduce the overall weight of the sprocket assembly. However, a result of the weight reduction may be a decrease in annular size and/or cross section of the individual sprockets and individual sprockets that are not supported in a radial direction or an axial direction. Instead, such assemblies rely on a flat shape of the sprocket to transmit the driving forces from the drive chain to the wheel hub.

The resulting small unsupported sections of the individual sprockets create areas of highly localized stress in the material, especially in the regions of the wells of the teeth of the individual sprockets. These areas of highly localized stress may cause premature failure in the unsupported areas of a bicycle cassette, especially for ultra-low-weight cassettes. Conversely, if a thickness of the unsupported areas is designed with enough strength to support the areas of localized stress, then the overall weight of the sprocket assembly and the bicycle cassette may become objectionably high.

SUMMARY OF THE INVENTION

A conical shaped bicycle cassette has a unitary sprocket assembly. Each annular portion of an individual sprocket is mechanically supported either from a back of the sprocket, in an axial direction toward a bicycle hub or from an inner radial direction toward a centerline axis of the bicycle cassette and hub. The axial support zones and radial support zones are alternated around a circumference of the sprocket so that an entirety of the sprocket is supported in either the axial direction or the radial direction. In this way, the chain driving loads on the cassette are spread throughout the entire cassette and the areas of highly localized stress from the cassette are removed.

In a first aspect, a conical shaped bicycle cassette comprises a unitary sprocket assembly comprising a first sprocket formed on the unitary sprocket assembly, a second sprocket formed on the unitary sprocket assembly, and connected to the first sprocket by a plurality of connecting portions, wherein each of the connecting portions comprises a vertical segment which spans a radial distance between an inner radius of the first sprocket and the second sprocket and an axial transition segment, which spans an axial distance between the inner radius of the first sprocket and the second sprocket. In some embodiments, each of the plurality of connecting portions comprise one or more machined windows. In some embodiments, the first sprocket and the second sprocket each comprise a plurality of repeating radial support zones and axial support zones around a circumference of the first sprocket and the second sprocket. In some embodiments, the first sprocket comprises one more tooth than the second sprocket.

A first aspect is directed to a conical shaped bicycle cassette. The cassette comprises a cassette locking screw, a large sprocket sub-assembly having one or more large sprockets and a unitary small sprocket sub-assembly coupled to the large sprocket sub-assembly with the cassette locking screw, the unitary small sprocket sub-assembly having a central axis and including a first sprocket having a plurality of outwardly extending first gear teeth, a first inner circumference opposite the first gear teeth, a plurality of first radial support members and a plurality of first axial support members, a second sprocket having a plurality of outwardly extending second gear teeth and a second inner circumference opposite the second gear teeth that is smaller than the first inner circumference and a third sprocket having a plurality of outwardly extending third gear teeth and a third inner circumference opposite the third gear teeth that is greater than the first inner circumference, wherein the first radial support members extend from the inner circumference in a radial direction toward the central axis, bend toward the second sprocket and couple to the second sprocket at a level of the second inner circumference, and further wherein the first axial support members extend toward the third sprocket in an axial direction parallel to the central axis, bend toward the third sprocket and couple to third inner circumference of the third sprocket.

In some embodiments, each of the plurality of first radial support members and the plurality of first axial support members has one or more machined windows. In some of the embodiments, the plurality of first radial support members are offset from the plurality of first axial support members along the first inner circumference of the first sprocket. In some embodiments, positions of the plurality of first radial support members and the plurality of first axial support members on the first sprocket alternate such that along the first inner circumference each first radial support of the first radial supports is straddled by two of the first axial supports and each first axial support of the first axial supports is straddled by two of the first radial supports. In some embodiments, a quantity of the first gear teeth is greater than a quantity of the second gear teeth and less than a quantity of the third gear teeth. In some embodiments, in a direction aligned with the central axis, a profile of both left and right sides of each of the plurality of radial supports and a profile of both left and right sides of each of the plurality of axial supports is curved. In some embodiments, in a direction aligned with the central axis, a profile of a majority of both left and right sides of each of the plurality of radial supports is straight and a profile of both left and right sides of each of the plurality of axial supports is straight. In some embodiments, the third sprocket is the largest sprocket of the unitary small sprocket sub-assembly, and further wherein the third sprocket has a plurality of tangs that extend radially from the third inner circumference in a same plane as the third gear teeth extend in an opposite direction. In some embodiments, the large sprocket sub-assembly comprises a plurality of locking flanges that each have a cutout, and further wherein each of the tangs is positioned within one of the cutouts in order to couple the large sprocket sub-assembly to the unitary small sprocket sub-assembly. In some embodiments, each of the first radial support members and first axial support members is comprised of a flat portion and a curved portion. In some embodiments, the curved portion is in the shape of a curve swept around the central axis.

A second aspect is directed to a unitary sprocket assembly having a central axis. The unitary sprocket assembly comprises a first sprocket having a plurality of outwardly extending first gear teeth, a first inner circumference opposite the first gear teeth, a plurality of first radial support members and a plurality of first axial support members, a second sprocket having a plurality of outwardly extending second gear teeth and a second inner circumference opposite the second gear teeth that is smaller than the first inner circumference and a third sprocket having a plurality of outwardly extending third gear teeth and a third inner circumference opposite the third gear teeth that is greater than the first inner circumference, wherein the first radial support members extend from the inner circumference in a radial direction toward the central axis, bend toward the second sprocket and couple to the second sprocket at a level of the second inner circumference, and further wherein the first axial support members extend toward the third sprocket in an axial direction parallel to the central axis, bend toward the third sprocket and couple to third inner circumference of the third sprocket.

In some embodiments, each of the plurality of first radial support members and the plurality of first axial support members has one or more machined windows. In some embodiments, the plurality of first radial support members are offset from the plurality of first axial support members along the first inner circumference of the first sprocket. In some embodiments, positions of the plurality of first radial support members and the plurality of first axial support members on the first sprocket alternate such that along the first inner circumference each first radial support of the first radial supports is straddled by two of the first axial supports and each first axial support of the first axial supports is straddled by two of the first radial supports. In some embodiments, a quantity of the first gear teeth is greater than a quantity of the second gear teeth and less than a quantity of the third gear teeth. In some embodiments, in a direction aligned with the central axis, a profile of both left and right sides of each of the plurality of radial supports and a profile of both left and right sides of each of the plurality of axial supports is curved. In some embodiments, in a direction aligned with the central axis, a profile of a majority of both left and right sides of each of the plurality of radial supports is straight and a profile of both left and right sides of each of the plurality of axial supports is straight. In some embodiments, the third sprocket is the largest sprocket of the unitary sprocket assembly, and further wherein the third sprocket has a plurality of tangs that extend radially from the third inner circumference in a same plane as the third gear teeth extend in an opposite direction. In some embodiments, each of the first radial support members and first axial support members is comprised of a flat portion and a curved portion. In some embodiments, the curved portion is in the shape of a curve swept around the central axis.

A third aspect is directed to a method of providing a conical shaped bicycle cassette. The method comprises providing a large sprocket sub-assembly having one or more large sprockets and coupling a unitary small sprocket sub-assembly to the large sprocket sub-assembly with a cassette locking screw, the unitary small sprocket sub-assembly having a central axis and including a first sprocket having a plurality of outwardly extending first gear teeth, a first inner circumference opposite the first gear teeth, a plurality of first radial support members and a plurality of first axial support members, a second sprocket having a plurality of outwardly extending second gear teeth and a second inner circumference opposite the second gear teeth that is smaller than the first inner circumference and a third sprocket having a plurality of outwardly extending third gear teeth and a third inner circumference opposite the third gear teeth that is greater than the first inner circumference, wherein the first radial support members extend from the inner circumference in a radial direction toward the central axis, bend toward the second sprocket and couple to the second sprocket at a level of the second inner circumference, and further wherein the first axial support members extend toward the third sprocket in an axial direction parallel to the central axis, bend toward the third sprocket and couple to third inner circumference of the third sprocket.

In some embodiments, each of the plurality of first radial support members and the plurality of first axial support members has one or more machined windows. In some embodiments, the plurality of first radial support members are offset from the plurality of first axial support members along the first inner circumference of the first sprocket. In some embodiments, positions of the plurality of first radial support members and the plurality of first axial support members on the first sprocket alternate such that along the first inner circumference each first radial support of the first radial supports is straddled by two of the first axial supports and each first axial support of the first axial supports is straddled by two of the first radial supports. In some embodiments, a quantity of the first gear teeth is greater than a quantity of the second gear teeth and less than a quantity of the third gear teeth. In some embodiments, in a direction aligned with the central axis, a profile of both left and right sides of each of the plurality of radial supports and a profile of both left and right sides of each of the plurality of axial supports is curved. In some embodiments, in a direction aligned with the central axis, a profile of a majority of both left and right sides of each of the plurality of radial supports is straight and a profile of both left and right sides of each of the plurality of axial supports is straight. In some embodiments, the third sprocket is the largest sprocket of the unitary small sprocket sub-assembly, and further wherein the third sprocket has a plurality of tangs that extend radially from the third inner circumference in a same plane as the third gear teeth extend in an opposite direction. In some embodiments, the large sprocket sub-assembly comprises a plurality of locking flanges that each have a cutout, the method further comprises sliding each of the tangs is into one of the cutouts before screwing in the cassette locking screw in order to couple the large sprocket sub-assembly to the unitary small sprocket sub-assembly. In some embodiments, each of the first radial support members and first axial support members is comprised of a flat portion and a curved portion. In some embodiments, the curved portion is in the shape of a curve swept around the central axis.

DETAILED DESCRIPTION OF THE EMBODIMENTS

Embodiments of the present invention are directed to a conical shaped bicycle cassette which has a unitary sprocket assembly. Each annular portion of an individual sprocket is mechanically supported either from a back of the sprocket, in an axial direction towards a center plane of a bicycle or from an inner radial direction toward a centerline axis of the bicycle cassette and hub. The axial support zones and radial support zones are alternated around a circumference of the sprocket so that an entirety of the sprocket is supported in either the axial direction or the radial direction. In this way, the chain driving loads on the cassette are spread throughout the entire cassette and the areas of highly localized stress from the cassette are removed.

Reference will now be made in detail to implementations of a Conical Bicycle Cassette Sprocket Structure. In the interest of clarity, not all of the routine features of the implementations described herein are shown and described. It will be appreciated that in the development of any such actual implementation, numerous implementation-specific decisions can be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The present application has been described in terms of specific embodiments incorporating details to facilitate the understanding of the principles of construction and operation. As such, references, herein, to specific embodiments and details thereof are not intended to limit the scope of the claims appended hereto. It will be apparent to those skilled in the art that modifications can be made in the embodiments chosen for illustration without departing from the spirit and scope of the invention.

Figure 1:
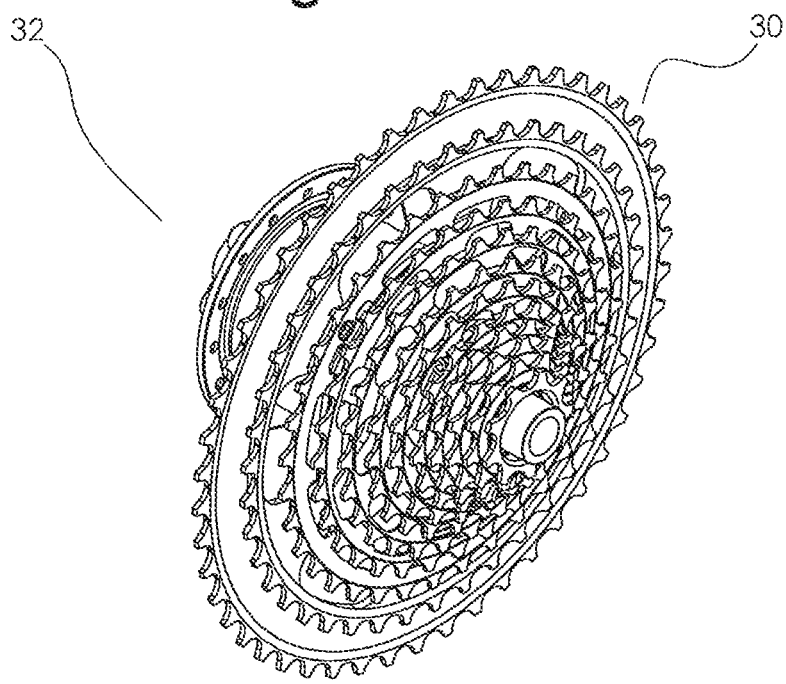
FIG. 1 illustrates an outer isometric view of a complete cassette assembly mounted to a rear bicycle hub, in accordance with some embodiments.
Figure 2:
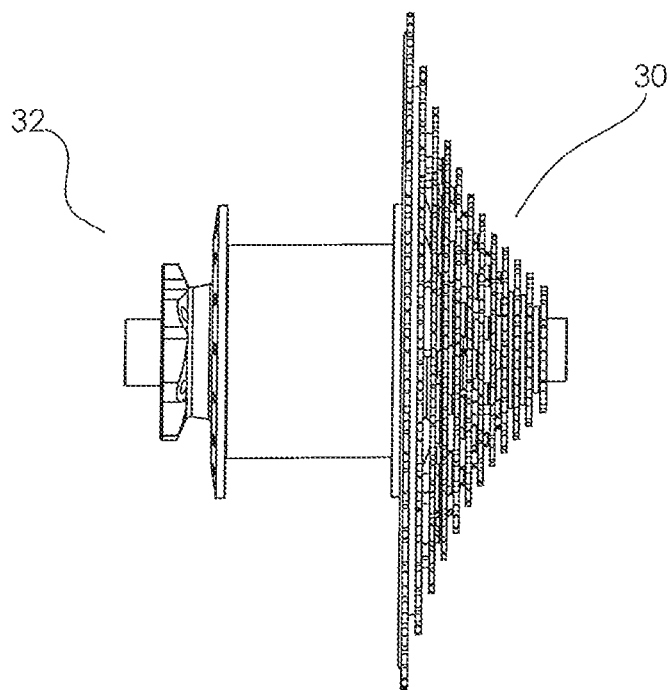
FIG. 2 illustrates a complete cassette assembly mounted to a rear bicycle hub, in accordance with some embodiments.

Referring now to FIGS. 1 and 2, a complete cassette assembly 30 is shown installed on the right of a Rear Bicycle Hub 32 according to some embodiments.

Figure 3:
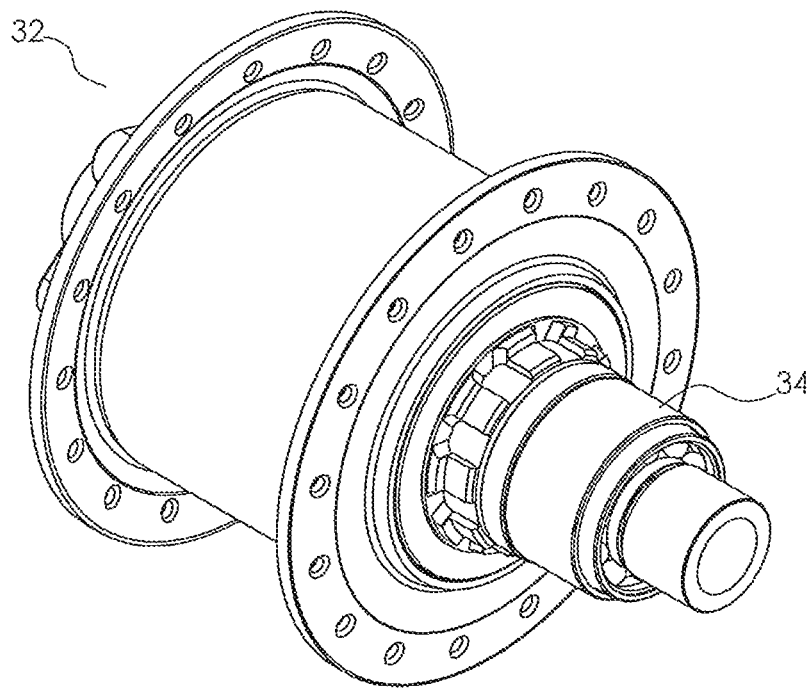
FIG. 3 illustrates an isometric view of a rear bicycle hub, in accordance with some embodiments.

FIG. 3 shows the rear bicycle hub 32 prior to installation of the complete cassette assembly 30, including the hub driver assembly 34 according to some embodiments.

Figure 4:
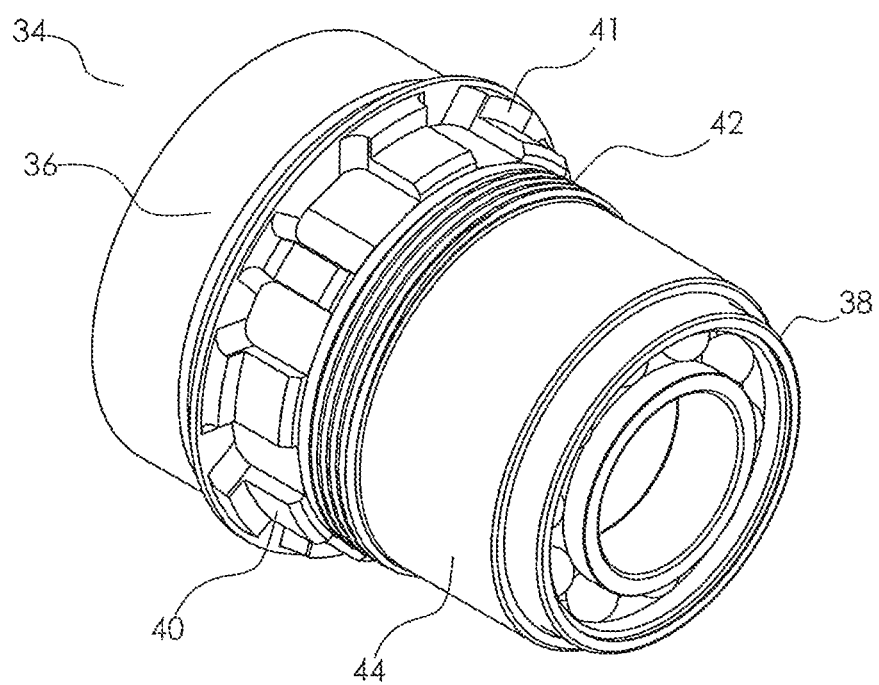
FIG. 4 illustrates an isometric view of a hub driver assembly, in accordance with some embodiments.

As shown in FIG. 4, according to some embodiments the hub driver assembly 34 includes a hub driver body 36, an outboard hub driver bearing 38, a hub driver torque coupling 40, a hub driver cassette stop face 41, a hub driver thread 42 and a hub driver right-end radial surface 44.

Figure 5:
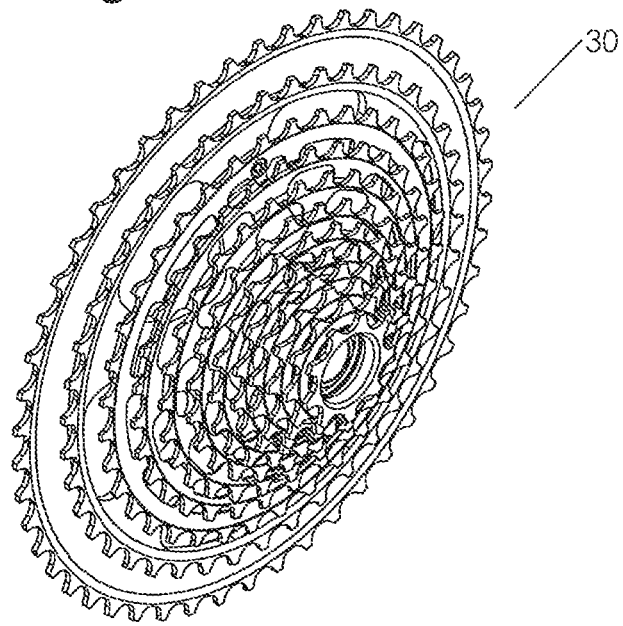
FIG. 5 illustrates an isometric outer view of a complete cassette assembly mounted to a hub driver, in accordance with some embodiments.
Figure 6:
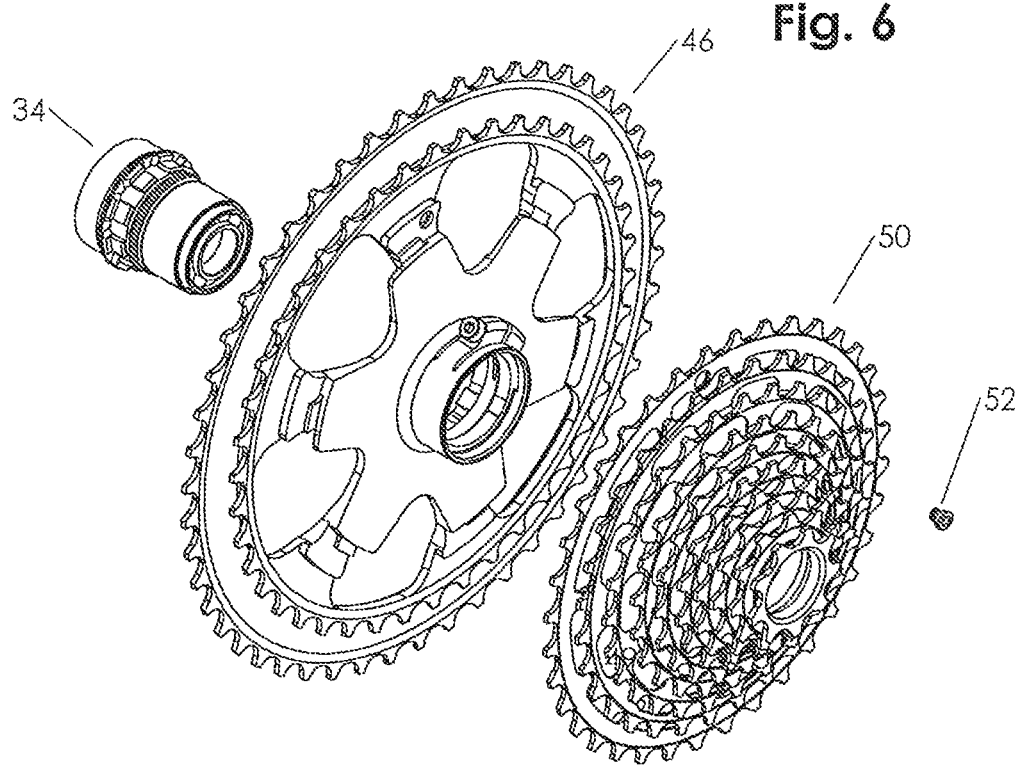
FIG. 6 illustrates an exploded view of a complete cassette assembly and hub driver, in accordance with some embodiments.

As shown in FIGS. 5 and 6, according to some embodiments a complete cassette assembly 30 includes a cassette large sprocket sub-assembly 46, a cassette small sprocket sub-assembly 50, and a cassette locking screw 52.

Figure 7:
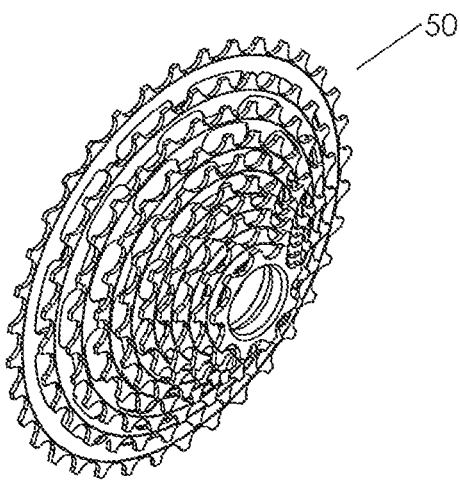
FIG. 7 illustrates an isometric outer view of a cassette small sprocket sub-assembly, in accordance with some embodiments.
Figure 8:
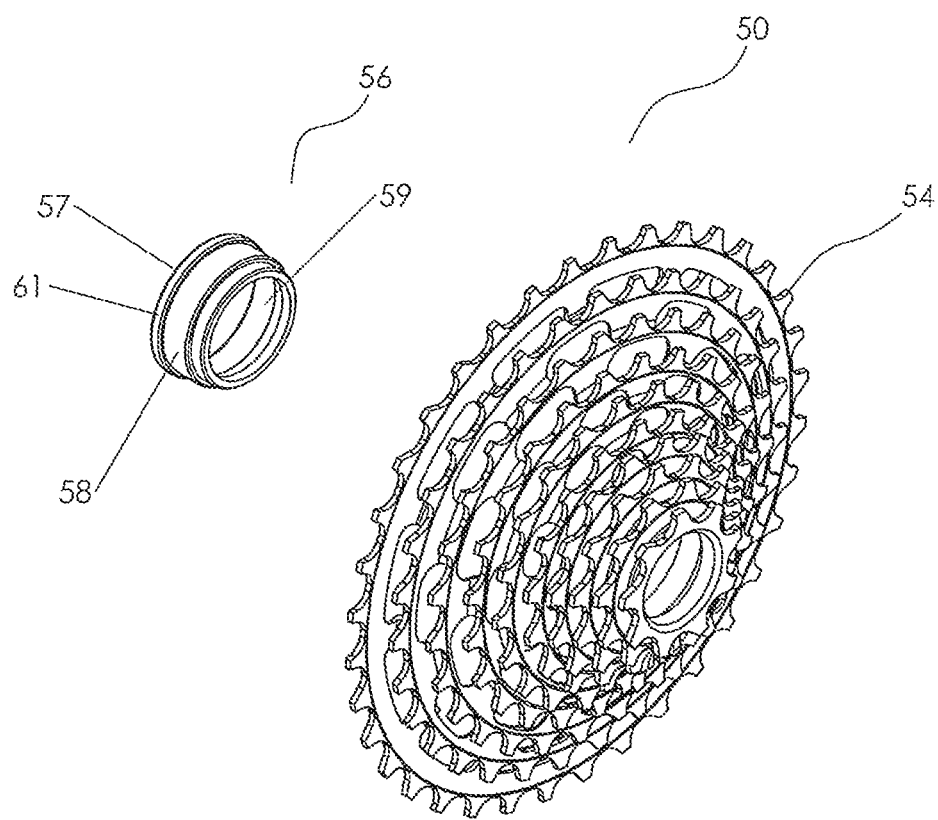
FIG. 8 illustrates a cassette small sprocket portion and cassette small sprocket bushing, in accordance with some embodiments.

As shown in FIGS. 7 and 8, according to some embodiments a cassette small sprocket sub-assembly 50 includes a cassette small sprocket portion 54 and a cassette small sprocket bushing 56. The cassette small sprocket bushing 56 includes a bushing flange 57, a bushing flange outside surface 61, a bushing outer stepped surface 58 and a bushing inner stepped surface 59.

Figure 9:
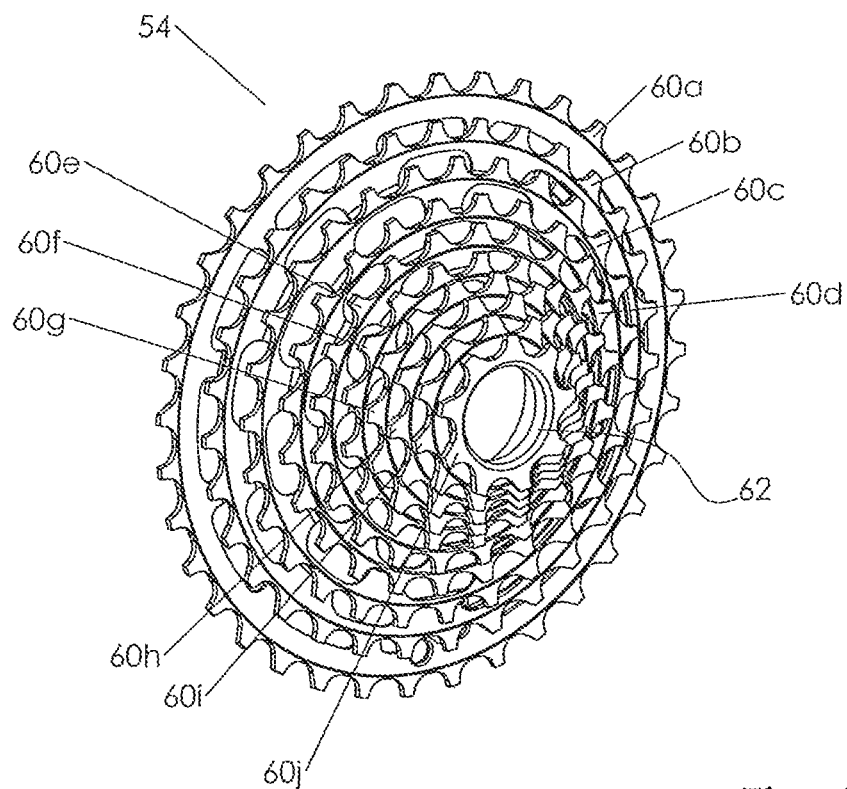
FIG. 9 illustrates an isometric outer view of a cassette small sprocket portion, in accordance with some embodiments.

FIG. 9 shows an outer side of a cassette small sprocket portion 54 according to some embodiments. The cassette small sprocket portion 54 includes 10 Small Portion Sprockets 60a, 60b, 60c, 60d, 60e, 60f, 60g, 60h, 60i and 60j and a small sprocket portion axle clearance hole 62. Alternatively, the cassette small sprocket portion 54 is able to include more or less small portion sprockets.

Figure 10:
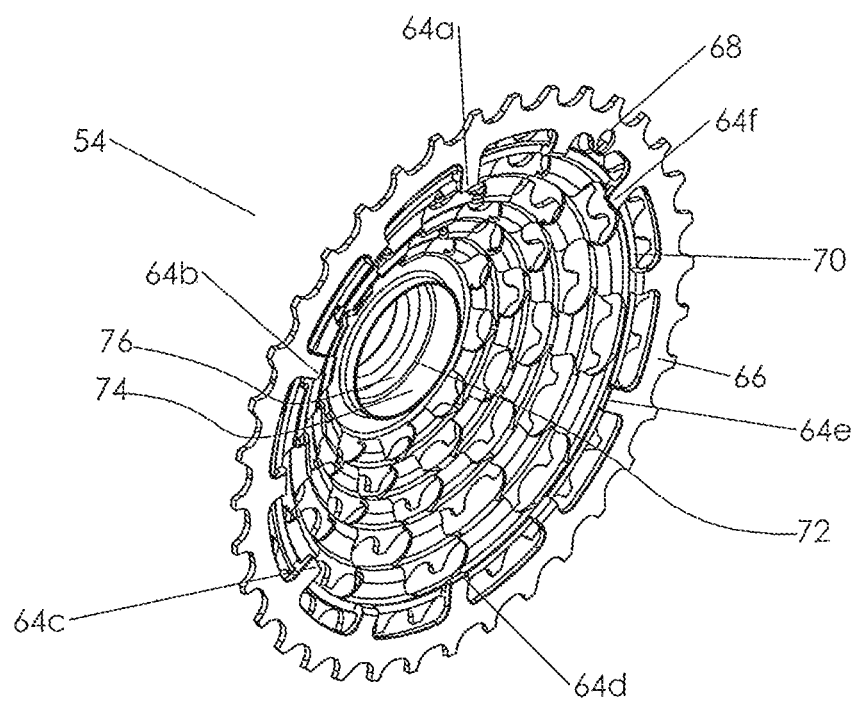
FIG. 10 illustrates an isometric inner view of a cassette small sprocket portion, in accordance with some embodiments.

FIG. 10 shows an inner side of the cassette small sprocket portion 54, including the locking tangs 64a, 64b, 64c, 64d, 64e and 64f and a small sprocket portion locking hole 68 according to some embodiments. The small sprocket portion 54 also includes a first small sprocket portion axial locating face 70, a second small sprocket portion axial locating face 72, a first small sprocket portion locating bore 74, a second small sprocket portion locating bore 76, and a small sprocket portion large end face 66.

Figure 11:
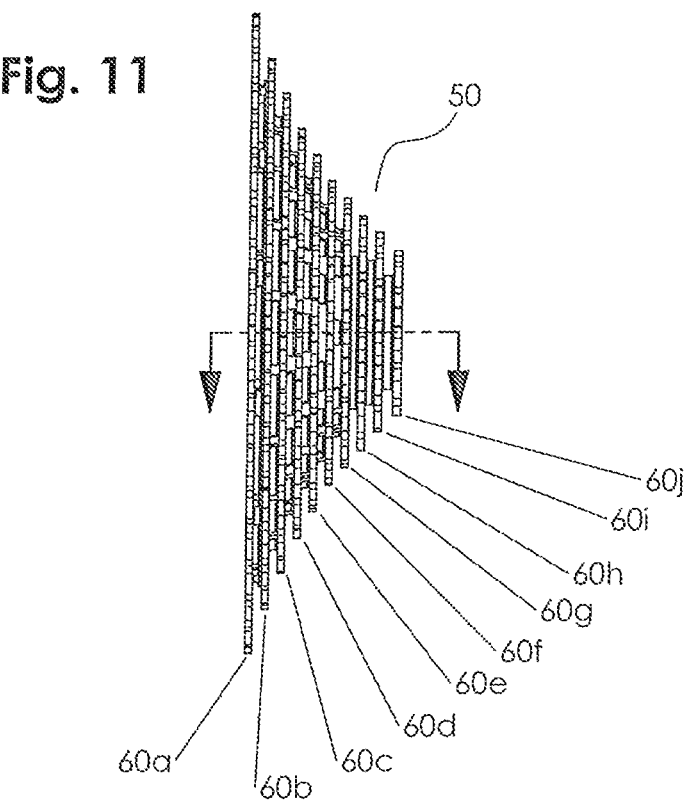
FIG. 11 illustrates a top view of a cassette small sprocket sub-assembly, in accordance with some embodiments.

As shown within FIG. 11, according to some embodiments, the cassette small sprocket sub-assembly 50 includes the small portion sprockets 60a, 60b, 60c, 60d, 60e, 60f, 60g, 60h, 60i and 60j.

Figure 12:
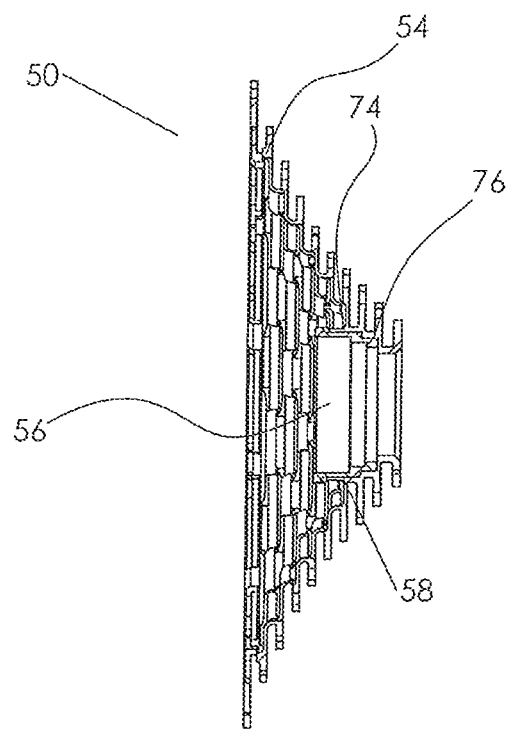
FIG. 12 illustrates a section view of a cassette small sprocket sub-assembly and bushing, in accordance with some embodiments.

FIG. 12 shows a cross section of the cassette small sprocket sub-assembly 50 at the arrow line shown in FIG. 11 according to some embodiments. The cassette small sprocket bushing 56 is assembled into the cassette small sprocket portion 54 such that the cassette outer stepped surface 58 fits inside the first small sprocket portion locating bore 74 and the Second Small Sprocket Portion locating Bore 76.

Figure 13:
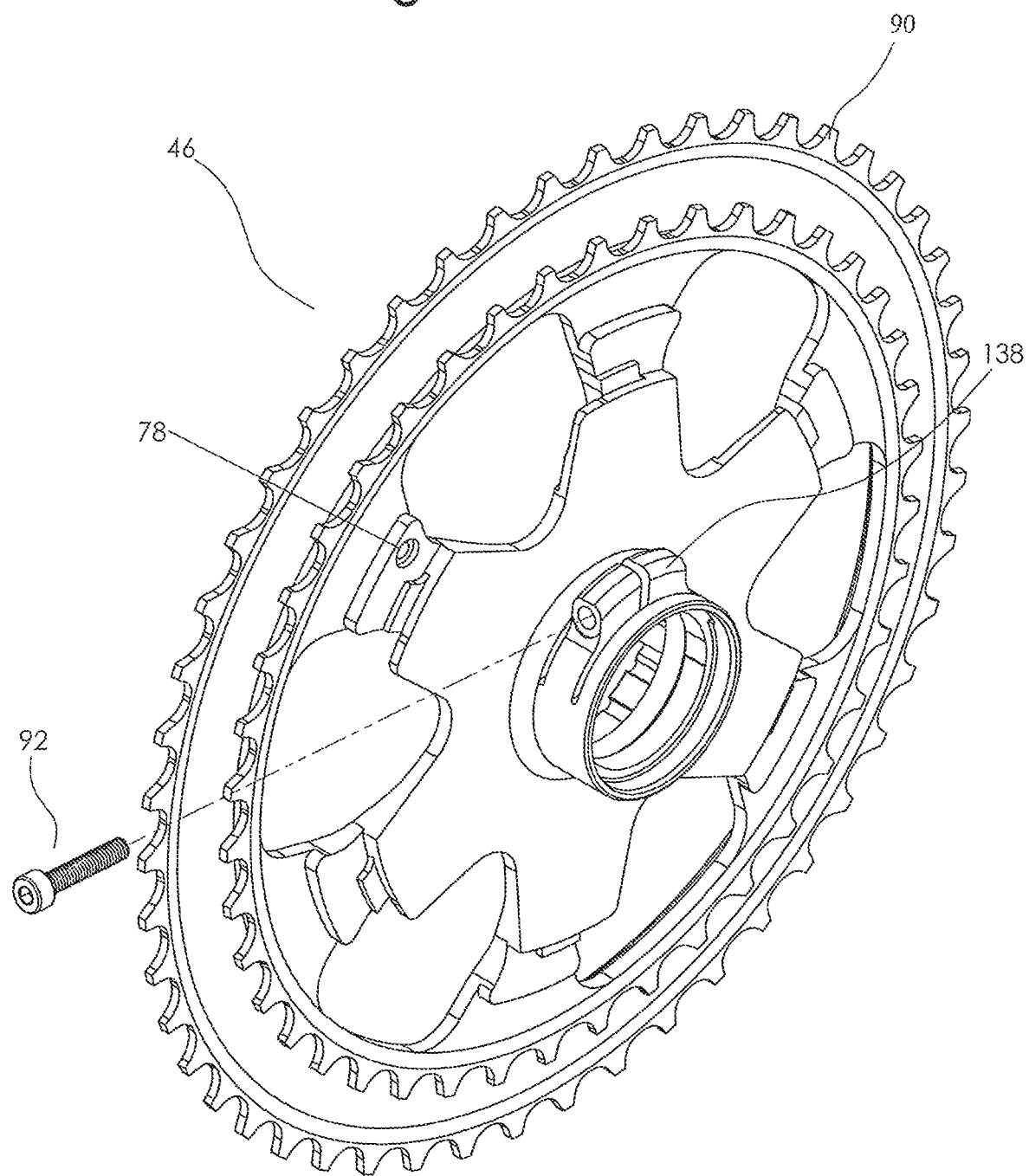
FIG. 13 illustrates an exploded view of a cassette large sprocket sub-assembly, in accordance with some embodiments.

FIG. 13 shows an exploded view of the cassette large sprocket sub-assembly 46, which includes the large sprocket portion 90 and the large sprocket clamp screw 92 according to some embodiments. FIG. 13 also shows the large portion clamp 138 and a locking screw receiving hole 78.

Figure 14:
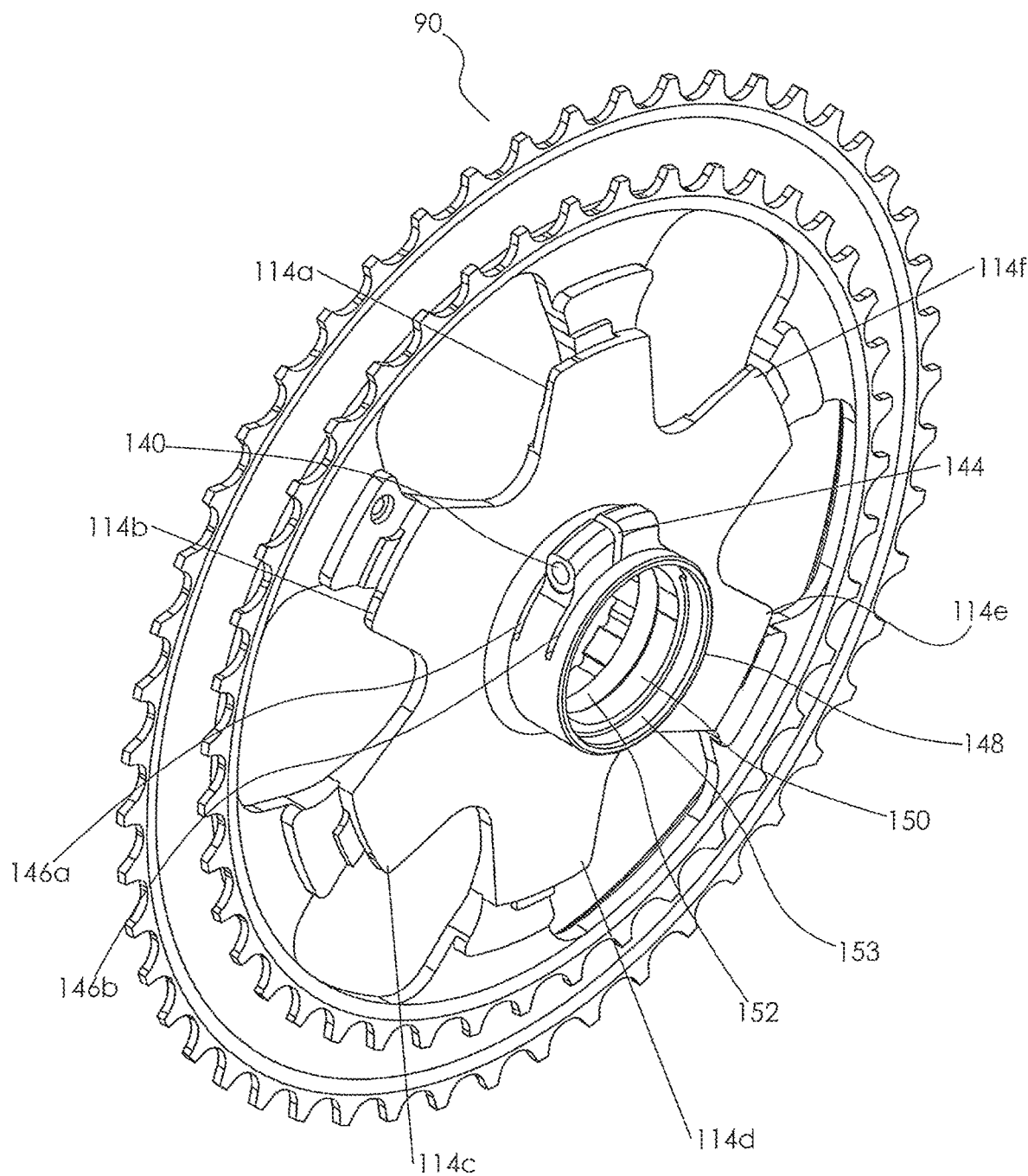
FIG. 14 illustrates an isometric outer view of a cassette large sprocket portion, in accordance with some embodiments.

FIG. 14 shows an outer isometric view of the cassette large sprocket portion 90, including the clamp screw clearance hole 140, clamp flexure slots 146a and 146b, and clamp clearance slot 144 according to some embodiments. FIG. 14 also shows the clamp boss end face 148 and clamp contact surface 150, and the locking flanges 114a, 114b, 114c, 114d, 114e and 114f. As further shown within FIG. 14 are thread clearance bore 152 and bushing flange locating bore 153.

Figure 15:
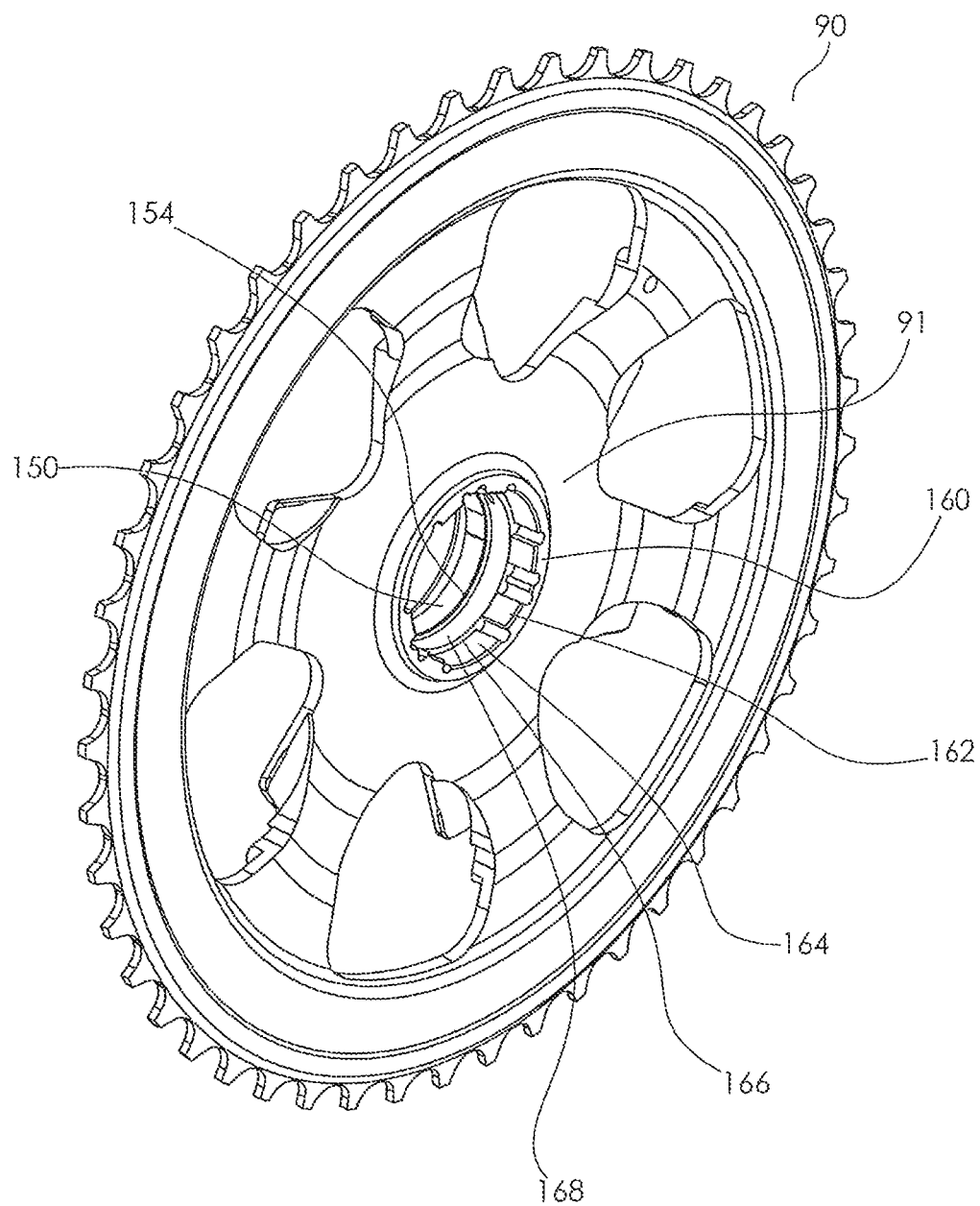
FIG. 15 illustrates an isometric inner view of a cassette large sprocket portion, in accordance with some embodiments.

FIG. 15 shows an inner view of the large sprocket portion 90, with details of the large sprocket driver torque coupling 91 according to some embodiments. The large sprocket driver torque coupling 91 is comprised of a driver torque coupling stop face 160, a torque coupling spline tooth 162, a torque coupling spline recess 164, and a torque coupling spline end face 166. The large sprocket portion 90 also includes a driver thread clearance bore 168 and a clamp inner end face 154 and the clamp contact surface 150.

Figure 16:
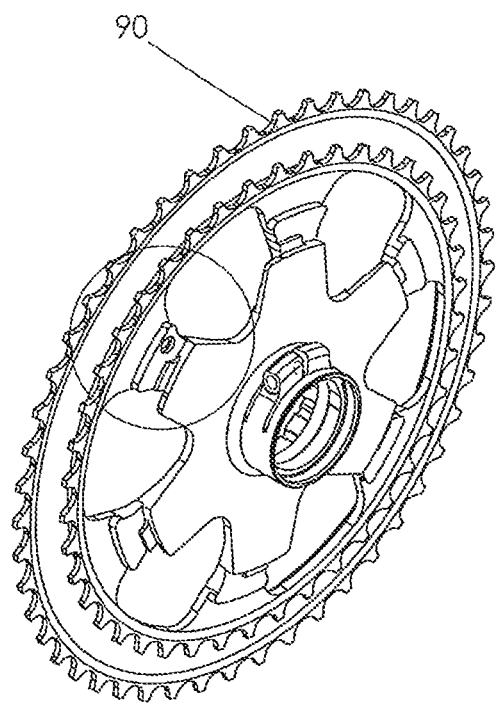
FIG. 16 illustrates an isometric outer view of a cassette large sprocket portion, in accordance with some embodiments.

FIG. 16 illustrates an outer isometric view of the cassette large sprocket portion 90 with a circle surrounding a section of a large sprocket cassette torque coupling of the cassette large sprocket portion 90 according to some embodiments.

Figure 17:
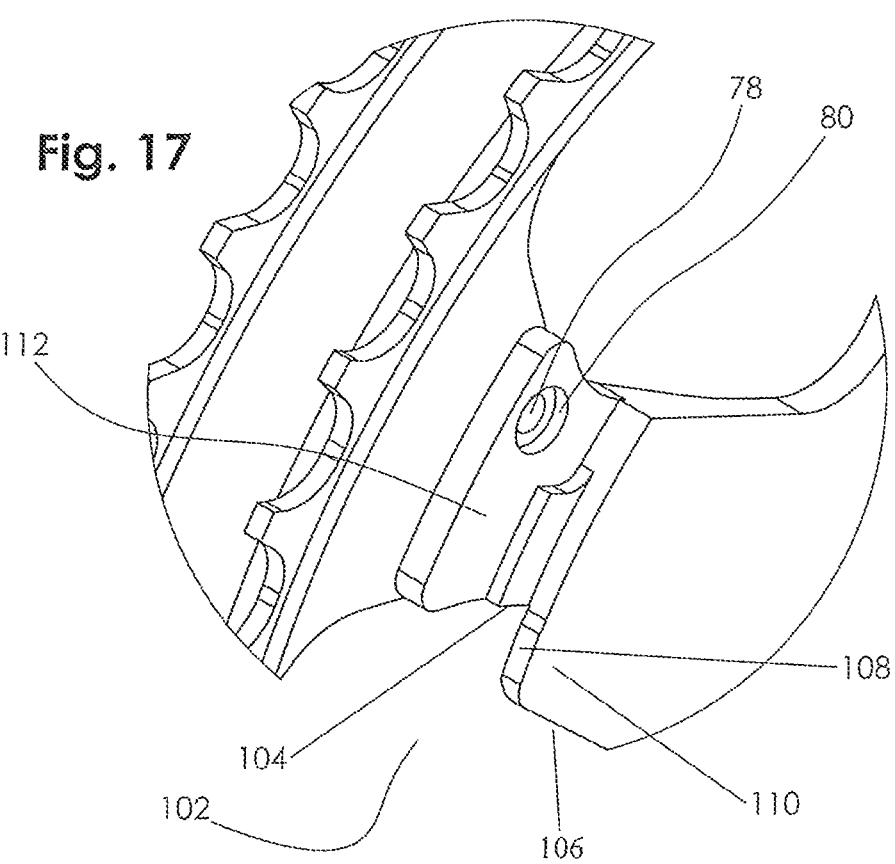
FIG. 17 illustrates a detail view of a cassette large sprocket portion, in accordance with some embodiments.

FIG. 17 illustrates a zoomed in view of the section within the circle shown in FIG. 16 according to some embodiments. As shown in Figure, 17, the large sprocket cassette torque coupling 91 shown in the section has several features, including a torque receiving face 104, one of the locking flanges 114 (having locking flange cutout 106, locking flange radial surface 108, and locking flange inside surface 110) and large sprocket portion offset boss 112. As shown in FIGS. 13-15, the features shown in the section are able to be repeated along the perimeter of the large sprocket cassette torque coupling. Additionally, one or more of the large sprocket cassette torque couplings is able to include locking screw receiving hole 78 having a locking screw receiving hole inner surface 80.

Figure 18:
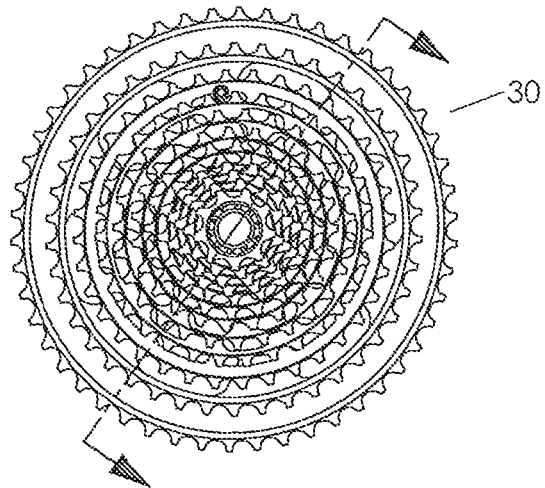
FIG. 18 illustrates an outer view of a complete cassette assembly installed on the hub driver assembly, in accordance with some embodiments.

FIG. 18 shows an outer view of the complete cassette assembly 30 installed on the hub driver assembly 34 according to some embodiments.

Figure 19:
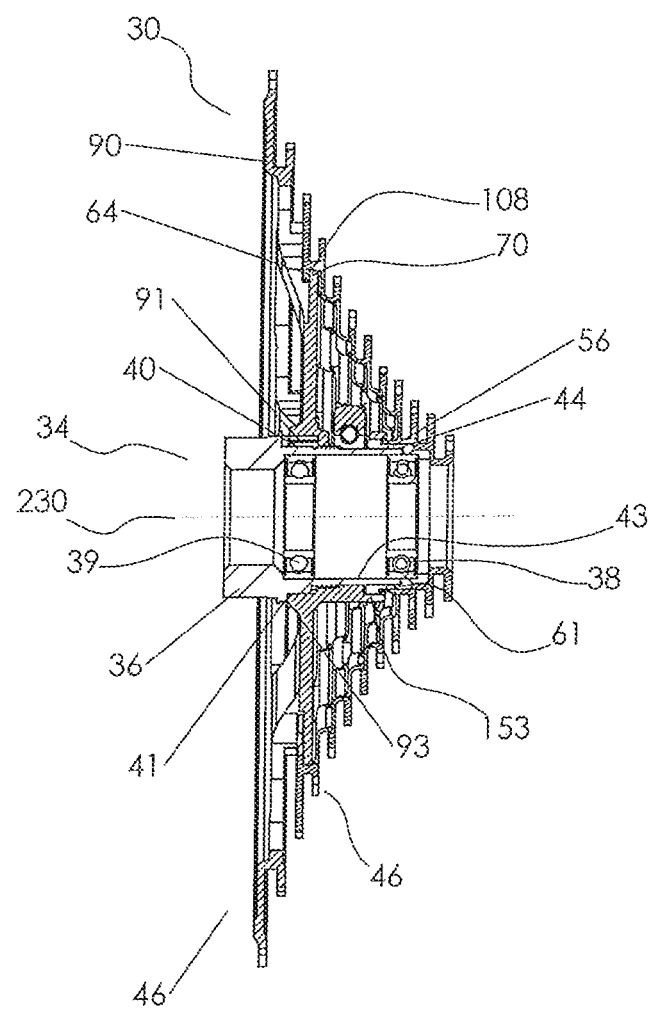
FIG. 19 illustrates a cross section of a complete cassette assembly mounted to the hub driver assembly and center axis.

FIG. 19 shows a cross-section of the complete cassette assembly 30 and hub driver assembly 34 (at the arrow line shown in FIG. 18) in a mounted and locked configuration according to some embodiments. As shown in FIG. 19, the complete cassette assembly 30 is mounted to the hub driver assembly 34 and together they have a center axis 230. The hub driver assembly 34 includes a hub driver body 36. Two bearings, the outboard hub driver bearing 38 and inboard hub driver bearing 39 are fitted in the inner hub driver bearing bore 43. The large sprocket portion 90 is fitted onto the hub driver body 36 so that the large sprocket driver torque coupling 91 engages the hub driver torque coupling 40, and the large sprocket coupling stop face 93 contacts the hub driver cassette stop face 41. The cassette small sprocket sub-assembly 50 is installed on the cassette large sprocket sub-assembly 46 and the hub driver assembly 34, so that the cassette small sprocket bushing 56 rests on the hub driver right-end radial surface 44. The cassette small sprocket bushing flange outside surface 61 fits inside the bushing flange locating bore 153. The locking flange 108 is coupled between the locking tang 64 and the first small sprocket portion axial locating face 70.

Figure 20:
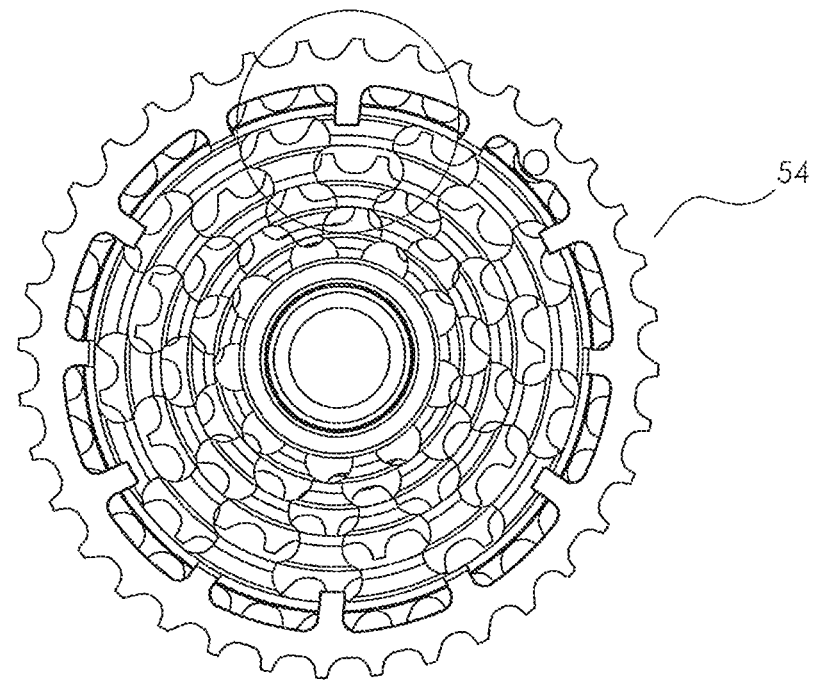
FIG. 20 illustrates an inner view of a cassette small sprocket portion, in accordance with some embodiments.
Figure 21:
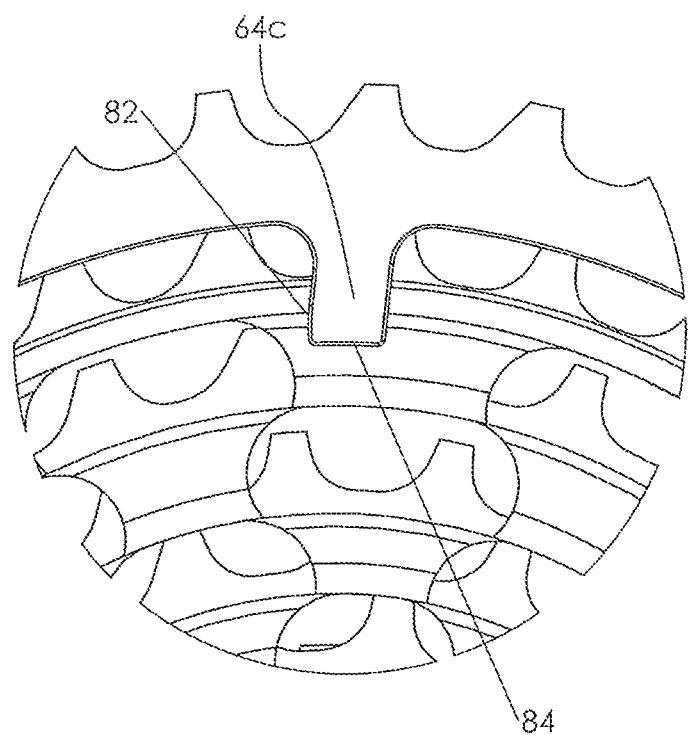
FIG. 21 illustrates an inner detail view of a cassette small sprocket portion, in accordance with some embodiments.

FIG. 20 illustrates an inner view of the cassette small sprocket portion 54 including a circled portion surrounding one of the locking tangs 64c according to some embodiments. FIG. 21 illustrates a zoomed in inner view of the locking tang 64c within the circle of FIG. 20 according to some embodiments. As shown in FIG. 21, the locking tang 64c comprises a torque driving face 82 and tang inside surface 84.

Figure 22:
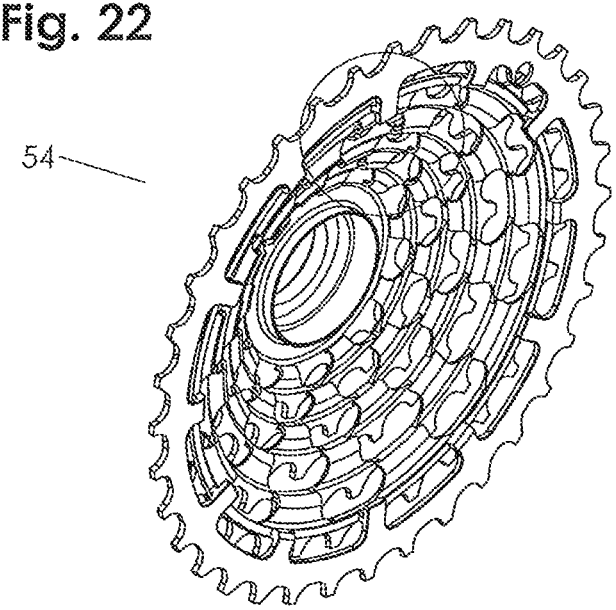
FIG. 22 illustrates an inner isometric view of a cassette small sprocket portion, in accordance with some embodiments.

FIG. 22 shows an inner front top isometric view of the cassette small portion 54 with a circled portion according to some embodiments.

Figure 23:
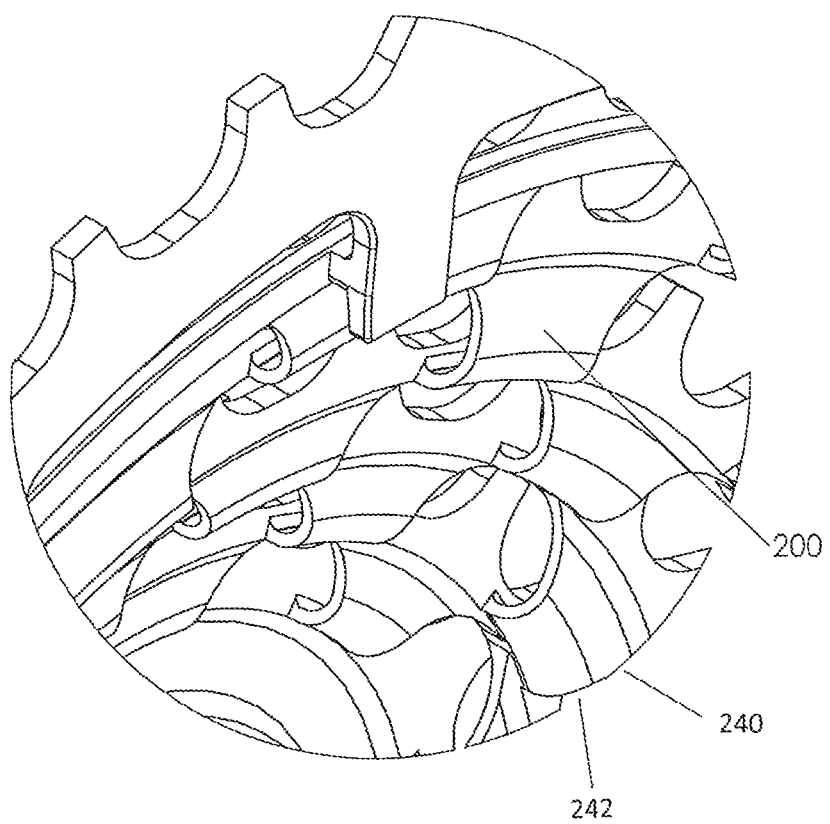
FIG. 23 illustrates a detail view of a cassette small sprocket portion with a connecting portion, in accordance with some embodiments.

FIG. 23 shows a detail view of the circled portion of the cassette small sprocket portion 54 of FIG. 22 according to some embodiments. As shown in FIG. 23, the cassette small sprocket portion 54 comprises a connection portion 200. Each of the connecting portions 200 comprise a flat, disc-like part 240 and a bell or swept curved part 242. In some embodiments, the bell or swept curved part 242 is in the shape of a curve swept around the central axis.

Figure 24:
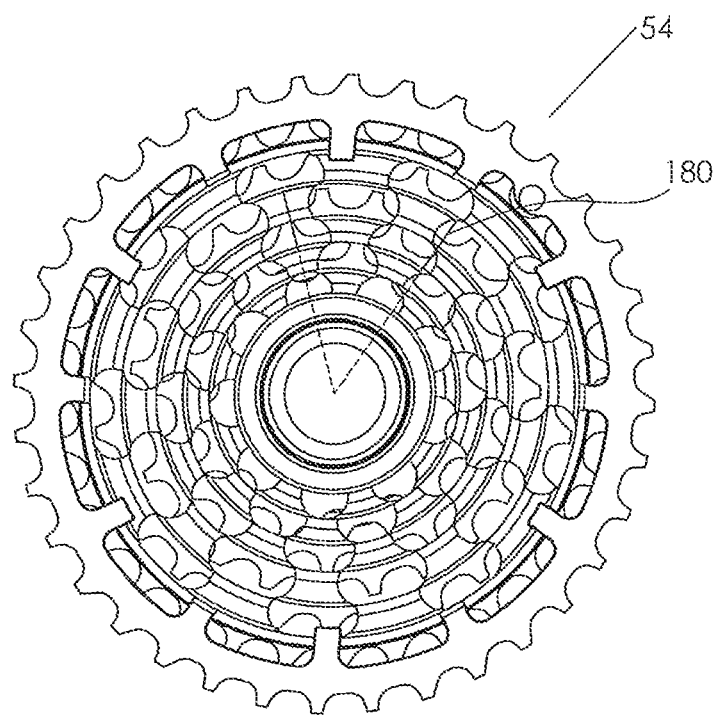
FIG. 24 illustrates an inner view of a cassette small sprocket portion, in accordance with some embodiments.

FIG. 24 shows an inner view of the cassette small sprocket portion 54 with a small sprocket detail cut out area 180 according to some embodiments.

Figure 25:
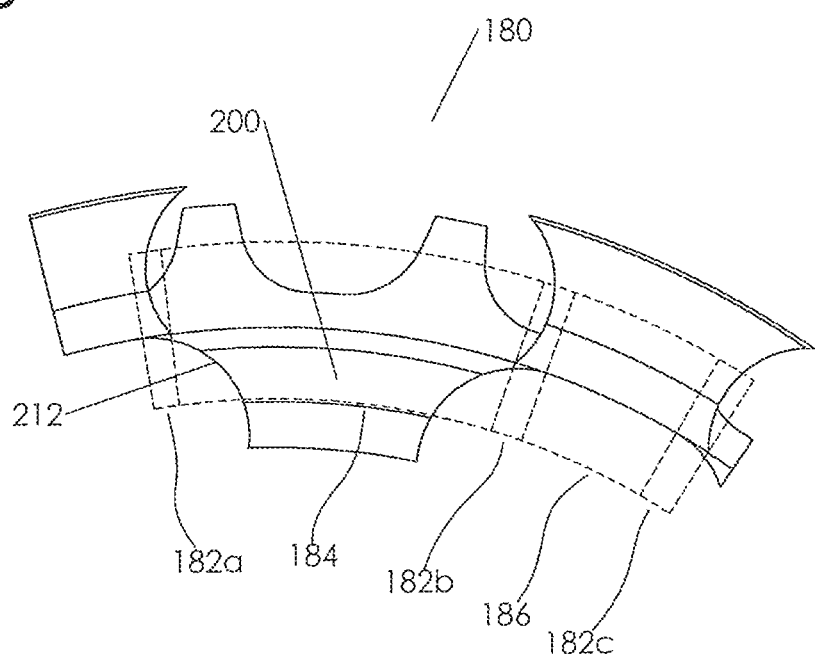
FIG. 25 illustrates an inner detail view of a cassette small sprocket portion, in accordance with some embodiments.
Figure 26:
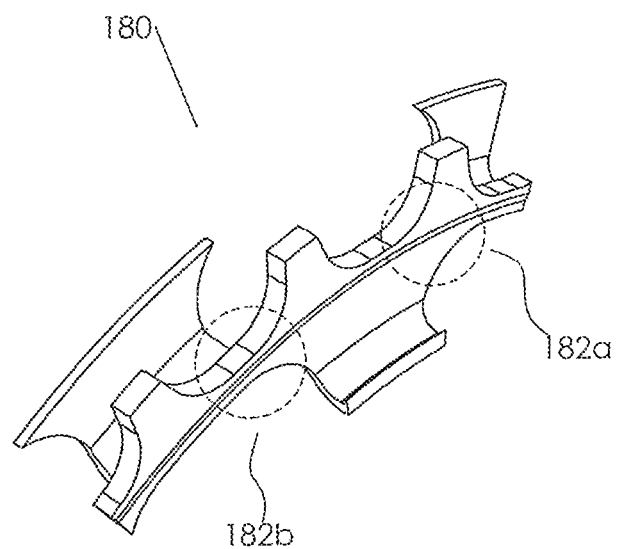
FIG. 26 illustrates an outer detail view of a cassette small sprocket portion, in accordance with some embodiments.
Figure 27:
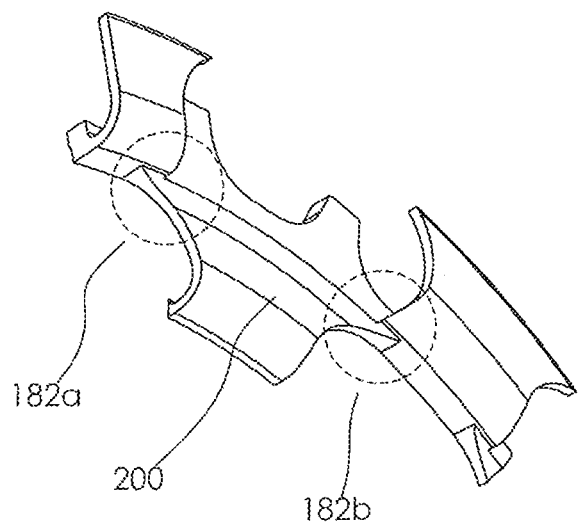
FIG. 27 illustrates a bottom inner detail view of a cassette small sprocket portion, in accordance with some embodiments.

FIGS. 25-27 show inner, outer isometric and inner isometric views of the detail cut out area 180 of FIG. 24, respectively, according to some embodiments. As shown in FIGS. 25-27, a sprocket of the small sprocket portion 54 comprises transition zones 182a, 182b, 182c, a radial support zone 184 and an axial support zone 186. The radial support zone 184 is configured to support the sprocket from an inner radial direction of the sprocket toward a centerline axis of the bicycle cassette and hub. The axial support zone 186 supports the sprocket in an axial direction toward the bicycle hub. In some embodiments, a plurality of radial support zones 184 and a plurality of axial support zones 186 are alternated around a circumference of some or all of the sprockets of the small sprocket portion 54 so that an entirety of each of the sprockets is supported in either the axial direction or the radial direction. In this manner, each annular portion of the sprocket is mechanically supported either from a back of the sprocket, in an axial direction toward the bicycle hub or from the inner radial direction toward the centerline axis of the bicycle cassette and hub. The plurality of radial and axial support zones provide the benefit of spreading the chain driving loads on the cassette throughout the cassette and removing the areas of highly localized stress from the individual sprockets.

As stated above, and as shown within FIGS. 25-27, in some embodiments, this is accomplished by alternating the radial support zones 184 and axial support zones 186 around a sprocket. The repeating radial support zones 184 and axial support zones 184 are illustrated in FIG. 24. Alternating the radial support zones 184 and the axial support zones 186 means that there will be an even number of each support zone around each sprocket. In some embodiments, a typical sprocket is able to comprise 6-12 radial support zones 184 and a corresponding 6-12 axial support zones 186. However, the sprocket is able to comprise more or less zones as appropriately desired and for a desired weight and strength ratio of the cassette.

Figure 32:
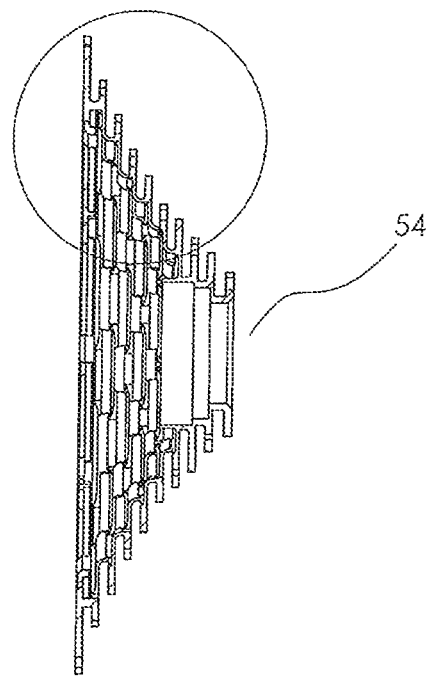
FIG. 32 illustrates a rear cross-section view of a cassette small sprocket portion, in accordance with some embodiments.
Figure 33:
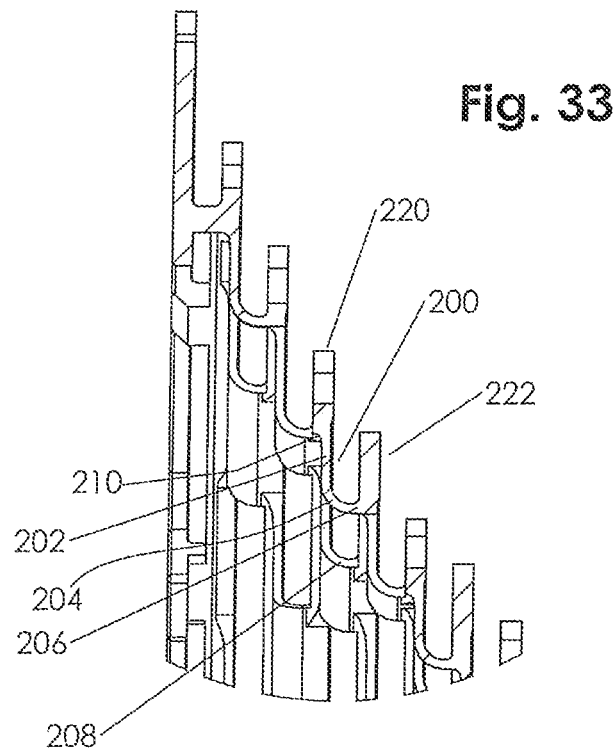
FIG. 33 illustrates a detail rear cross-section view of a cassette small sprocket portion, in accordance with some embodiments.

The connections between the sprockets in the support zones are accomplished by a plurality of connection portions 200. FIG. 32 illustrates a rear cross-section view of the cassette small sprocket portion 54 substantially similar to FIG. 12 except with a circled portion according to some embodiments. FIG. 33 illustrates a zoomed in view of the circled portion of FIG. 32 according to some embodiments. As shown in FIG. 32, the connecting portion 200, which provides a connection between the sprockets of the cassette small sprocket portion 54, comprises a connecting portion vertical segment 202 and a connecting portion transition segment 204, a connecting portion rear attachment point 206, a connection portion radial undercut 210 and a connecting portion side cut face 208.

A radial transition between a first sprocket 220 and a second sprocket 222 is accomplished by the connecting portion vertical segment 202, which spans some part of the radial distance between the inner radius of the first sprocket 220 and the second sprocket 222. The axial distance between the first sprocket 220 and the second sprocket 222 is accounted for by the connecting portion axial transition segment 204. In some embodiments, the connecting portion axial transition segment 204 comprises a portion of a geometric toroid, comprising a portion of a circle revolved around the center axis 230 of the cassette small sprocket portion 54.

In some embodiments, the transition zones 182a, 182b and 182c are able to also employ different geometry to optimize the strength, stiffness and weight of the cassette. In some embodiments, a geometry of the transition zones is generated by creating the largest possible transition cut radius 212 (see FIG. 25), to enable the features to be cut using a large machining tool.

The first sprocket 220 and the second sprocket 222 each comprise a plurality of teeth for engaging a drive chain (not shown). In some embodiments the larger diameter first sprocket 220 has one more tooth than the smaller diameter second sprocket 222. For example, in some embodiments the larger diameter first sprocket 220 is able to comprise ten teeth, while the smaller diameter second sprocket 222 comprises nine teeth. In some embodiments, the larger diameter first sprocket 220 comprises at least two more teeth than the smaller diameter second sprocket 222. In some embodiments, the portion 54 is able to have any number of sprockets, wherein the sprocket having the largest diameter is adjacent the inner side of the portion 54, the sprocket having the smallest diameter is adjacent the outer side of the portion 54, and each sprocket from the innermost sprocket to the outermost sprocket has an incrementally smaller diameter (and/or number of teeth) than the previous one.

In some embodiments, a thickness of the connection portion vertical segment 202 and a thickness of the connecting portion axial transition segment 204 is the same. Alternatively, the thickness of the connection portion vertical segment 202 and a thickness of the connecting portion axial transition segment 204 is different. Particularly, in some embodiments, the thickness of the connection portion vertical segment 202 and a thickness of the connecting portion axial transition segment 204 throughout each sprocket of the small sprocket portion 54 is the same. In some embodiments, one or more holes are cut between the repeating radial support zones 184 and axial support zones 186 of the first sprocket 220 and the second sprocket 220 to reduce the weight of the cassette. Particularly, a desired thickness of the connecting portion vertical segment 202 and the connecting portion axial transition segment 204 and a transition cut radius 212 is able to be chosen to provide an appropriate strength, stiffness and weight to the overall cassette structure.

As described above, the cassette small sprocket portion 54, shows one or more connection portions 200 for connection a plurality of sprockets in accordance with some embodiments. In some embodiments, the cassette large sprocket portion 46/90 is able to comprise one or more connection portions 200. Particularly, in some embodiments one or both of the cassette large sprocket portions 46/90 and the small sprocket portion 54 comprise one or more connection portions 200.

Figure 28:
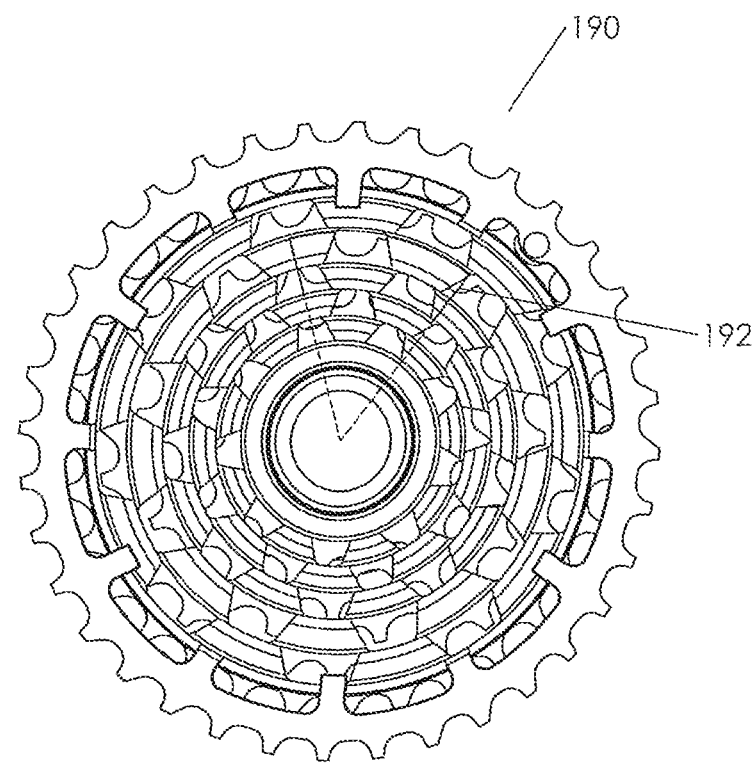
FIG. 28 illustrates an inner view of a cassette small sprocket portion, in accordance with some embodiments.
Figure 29:
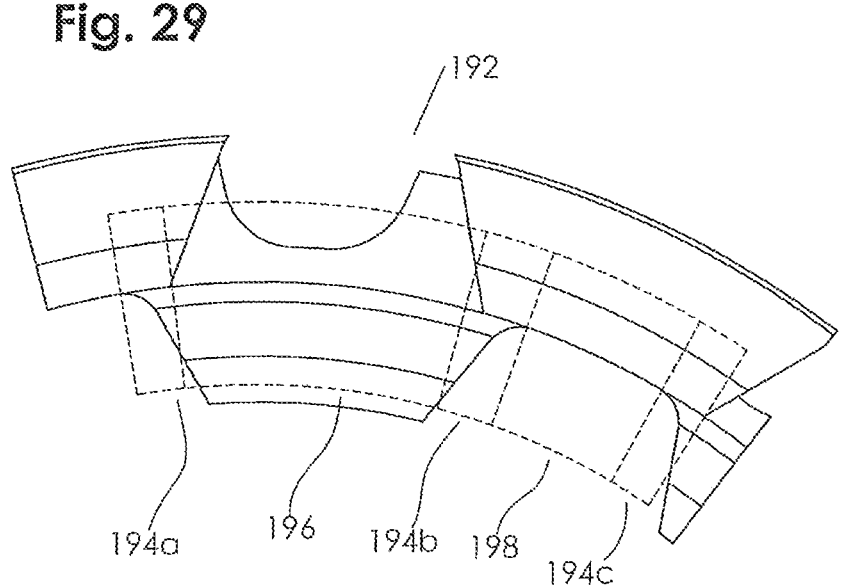
FIG. 29 illustrates an inner detail view of a cassette small sprocket portion, in accordance with some embodiments.
Figure 30:
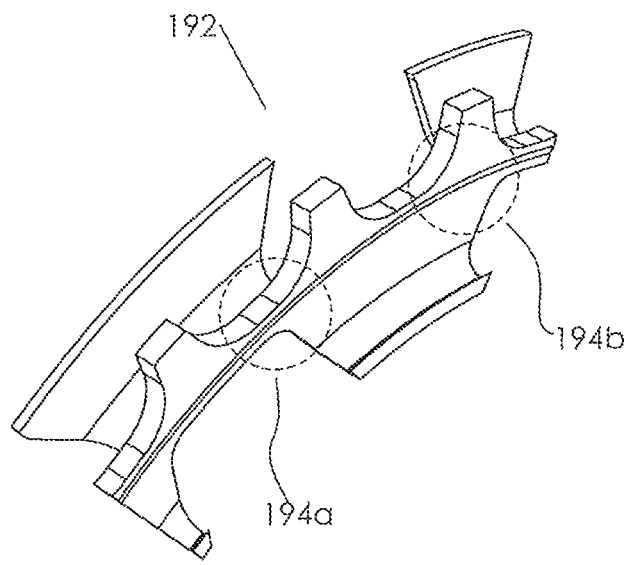
FIG. 30 illustrates an outer isometric detail view of a cassette small sprocket portion, in accordance with some embodiments.
Figure 31:
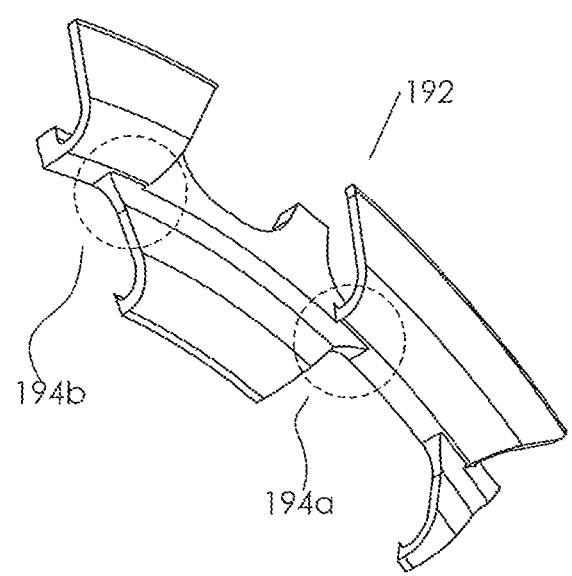
FIG. 31 illustrates a bottom inner isometric detail view of a cassette small sprocket portion, in accordance with some embodiments.

FIG. 28 shows inner view of an alternative cassette small sprocket portion 190, in accordance with further embodiments, with a detail cut view area 192. The small sprocket portion 190 is able to be substantially similar to the cassette small sprocket portion 54 except for the differences described herein. FIGS. 29-31 illustrate an inner zoomed in view, an outer zoomed in perspective view and an inner zoomed in perspective view of the detail cut view area 192 shown in FIG. 28, respectively. As shown in FIGS. 29-31, the small sprocket portion 190 is able to comprise five transition zones 194a, 194b and 194c, a radial support zone 196 and an axial support zone 198, similar to those as described above in FIGS. 25-27. The transition zones 194a and 194b are indicated as the region circled in the detail. In some embodiments, a geometry of the transition zones is cut using a smaller tool to make the shapes as shown in the transition zones 194a, 194b, and 194c where there is a straight edge with a small radius forming the transition features.

The assembly and operation of the cassette is disclosed in U.S. patent application Ser. No. 16/104,635 (the '635 Application) and entitled "Bicycle Cassette with Clamping Connection" filed Aug. 17, 2018, which is hereby incorporated by reference. However, it should be noted that the construction details described herein are able to be applied to a wide variety of cassette attachment methods, such as those disclosed in U.S. patent application Ser. No. 13/307,331 by Braedt, U.S. Ser. No. 14/923,343 by Earle and PCT Publication No. WO2018/041409 by Vergara, and others in which cassettes with multiple sprockets made from one piece of material are attached to a bicycle hub.

The complete cassette assembly 30 is able to be assembled onto a rear bicycle hub 32 using common tools well known to bicycle mechanics and others familiar with bicycle construction and assembly. In some embodiments, the tools needed for assembly of the preferred embodiment shown in the drawings are a hex key or other tool fitted to the cassette locking screw 52 and the cassette clamp screw 92. Assembly is able to be further simplified by using the same tool interface on said screws, such that one tool is sufficient to assemble or mount or demount the cassette from assembly from the hub.

To assemble the complete cassette assembly 30, the cassette large sprocket sub-assembly 46 slides over the hub driver right-end radial surface 44 towards the left end of the rear bicycle hub 32 until the large sprocket driver torque coupling 91 is engaged with the hub driver torque coupling 40. The large sprocket coupling top face 160 is pressed against the hub driver cassette top face 41.

Once the cassette large sprocket sub-assembly 46 is completely engaged on the hub, the large sprocket clamp screw 92 is tightened to an appropriate torque value using the hex key or other tool. Applying torque to the screw closes the clamp clearance slot 144, and creates pressure between the clamp contact surface 150 and the hub driver right-end radial surface 44, which in turn prevents the large sprocket sub-assembly 46 from moving on the hub driver body 36.

In some embodiments, the thread clearance bore 152 on the large sprocket portion 90 allows the large sprocket portion 90 to assemble to the hub driver body 36 without use of the hub driver thread 42. In such embodiments, the threads 42 of the hub driver body 36 are able to be omitted.

After tightening the large sprocket clamp screw 92, the cassette small sprocket sub-assembly 50 is able to be installed. The bushing inner stepped surface 59 is aligned with the hub driver right-end radial surface 44, and the locking tangs 64 are aligned with the locking flanges 114.

After proper alignment, the cassette small sprocket sub-assembly 50 slides towards the left end of the rear bicycle hub 32 until the second small sprocket portion axial locating face 72 contacts the locking flange inside surface face 110. Once the cassette small sprocket sub-assembly 50 is in place, it is able to be rotated by hand or with the use of a tool in the clockwise direction relative to the cassette large sprocket sub-assembly 46, until a torque driving face 82 contacts a torque receiving face 104. At this point, the cassette small sprocket sub-assembly 50 can no longer move to the left along the hub axis because the locking flanges 114 are contained between the first small sprocket portion axial locating face 70 and the locking tangs 64.

Next the cassette locking screw 52 is inserted into the locking screw receiving hole 78 through the small sprocket portion locking hole 68, and tightened using an appropriate tool. Once appropriate torque has been applied to said screw, the cassette 30 is fully installed.

To disassemble the Cassette Small Sprocket Sub-Assembly 50 from the Cassette Large Sprocket Sub-Assembly 46, the assembly instructions are simply reversed.

A conical shaped bicycle cassette with a unitary sprocket assembly is described herein. In operation, each annular portion of an individual sprocket of a cassette body is mechanically supported either from a back of the sprocket, in an axial direction toward a bicycle hub or from an inner radial direction toward a centerline axis of the bicycle cassette and hub. The axial support zones and radial support zones are alternated around a circumference of the sprocket so that an entirety of the sprocket is supported in either the axial direction or the radial direction. In this way, the chain driving loads on the cassette are spread throughout the entire cassette and the areas of highly localized stress from the cassette are removed.

Particularly, when cutting or forming the bicycle cassette, such as described above, a material thickness and cutting of the connecting portions and holes are able to be chosen to provide ideal strength, stiffness and weight to the cassette structure. Additionally, if cutting operations besides machining (such as electrical discharge machining, or others) are used for manufacturing, the shape of these openings could be expanded to include sharper edges or non-circular curves such as spline curves. While this has mostly been described in terms of removing material from a unitary piece of base material using various well known cutting processes, the cassette could also easily be formed using any number of well-known additive material processes, such as casting, 3D printing or laser sintering.

Additionally, the thickness of each support portion, and the length of overlap between the support zones in the transition areas are able to be optimized for any given cassette configuration to provide adequate strength and stiffness for the application. For instance a cassette designed to be used with an electric assist bicycle might need thicker supports and more overlap between the support regions. As such, the conical bicycle cassette sprocket structure as described herein has many advantages.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A conical shaped bicycle cassette comprising:
   a cassette locking screw;
   a large sprocket sub-assembly having one or more large sprockets; and
   a unitary small sprocket sub-assembly detachably coupled to the large sprocket sub-assembly with the cassette locking screw, the unitary small sprocket sub-assembly having a central axis and including:
   a first sprocket having a plurality of outwardly extending first gear teeth, a first inner circumference opposite the first gear teeth, a plurality of first radial support members and a plurality of first axial support members, wherein the plurality of first radial support members are circumferentially offset from the plurality of first axial support members;
   a second sprocket having a plurality of outwardly extending second gear teeth, a second inner circumference opposite the second gear teeth that is smaller than the first inner circumference, a plurality of second radial support members and a plurality of second axial support members, wherein the plurality of second radial support members are circumferentially offset from the plurality of second axial support members; and a third sprocket having a plurality of outwardly extending third gear teeth and a third inner circumference opposite the third gear teeth that is greater than the first inner circumference;

wherein the first radial support members extend from the inner circumference in a radial direction toward the central axis, bend toward the second sprocket and couple to the second sprocket at a level of the second inner circumference, and further wherein the first axial support members extend toward the third sprocket in an axial direction parallel to the central axis, bend toward the third sprocket and couple to third inner circumference of the third sprocket.

2. The bicycle cassette of claim 1, wherein each of the plurality of first radial support members and the plurality of first axial support members has one or more machined windows.

3. The bicycle cassette of claim 1, wherein positions of the plurality of first radial support members and the plurality of first axial support members on the first sprocket alternate such that along the first inner circumference each first radial support of the first radial supports is straddled by two of the first axial supports and each first axial support of the first axial supports is straddled by two of the first radial supports.

4. The bicycle cassette of claim 1, wherein a quantity of the first gear teeth is greater than a quantity of the second gear teeth and less than a quantity of the third gear teeth.

5. The bicycle cassette of claim 1, wherein in a direction aligned with the central axis, a profile of both left and right sides of each of the plurality of radial supports and a profile of both left and right sides of each of the plurality of axial supports is curved.

6. The bicycle cassette of claim 1, wherein in a direction aligned with the central axis, a profile of a majority of both left and right sides of each of the plurality of radial supports is straight and a profile of both left and right sides of each of the plurality of axial supports is straight.

7. The bicycle cassette of claim 1, wherein the third sprocket is the largest sprocket of the unitary small sprocket sub-assembly, and further wherein the third sprocket has a plurality of tangs that extend radially from the third inner circumference in a same plane as the third gear teeth extend in an opposite direction.

8. The bicycle cassette of claim 7, wherein the large sprocket sub-assembly comprises a plurality of locking flanges that each have a cutout, and further wherein each of the tangs is positioned within one of the cutouts in order to couple the large sprocket sub-assembly to the unitary small sprocket sub-assembly.

9. The bicycle cassette of claim 7, wherein each of the first radial support members and first axial support members is comprised of a flat portion and a curved portion.

10. The bicycle cassette of claim 9, wherein the curved portion is in the shape of a curve swept around the central axis.

11. A unitary sprocket assembly having a central axis, the unitary sprocket assembly comprising:

a first sprocket having a plurality of outwardly extending first gear teeth, a first inner circumference opposite the first gear teeth, a plurality of first radial support members and a plurality of first axial support members, wherein the plurality of first radial support members are circumferentially offset from the plurality of first axial support members;

a second sprocket having a plurality of outwardly extending second gear teeth, a second inner circumference opposite the second gear teeth that is smaller than the first inner circumference, a plurality of second radial support members and a plurality of second axial support members, wherein the plurality of second radial support members are circumferentially offset from the plurality of second axial support members; and a third sprocket having a plurality of outwardly extending third gear teeth and a third inner circumference opposite the third gear teeth that is greater than the first inner circumference;

wherein the first radial support members extend from the inner circumference in a radial direction toward the central axis, bend toward the second sprocket and couple to the second sprocket at a level of the second inner circumference, and further wherein the first axial support members extend toward the third sprocket in an axial direction parallel to the central axis, bend toward the third sprocket and couple to third inner circumference of the third sprocket.

12. The unitary sprocket assembly of claim 11, wherein each of the plurality of first radial support members and the plurality of first axial support members has one or more machined windows.

13. The unitary sprocket assembly of claim 11, wherein positions of the plurality of first radial support members and the plurality of first axial support members on the first sprocket alternate such that along the first inner circumference each first radial support of the first radial supports is straddled by two of the first axial supports and each first axial support of the first axial supports is straddled by two of the first radial supports.

14. The unitary sprocket assembly of claim 11, wherein a quantity of the first gear teeth is greater than a quantity of the second gear teeth and less than a quantity of the third gear teeth.

15. The unitary sprocket assembly of claim 11, wherein in a direction aligned with the central axis, a profile of both left and right sides of each of the plurality of radial supports and a profile of both left and right sides of each of the plurality of axial supports is curved.

16. The unitary sprocket assembly of claim 11, wherein in a direction aligned with the central axis, a profile of a majority of both left and right sides of each of the plurality of radial supports is straight and a profile of both left and right sides of each of the plurality of axial supports is straight.

17. The unitary sprocket assembly of claim 11, wherein the third sprocket is the largest sprocket of the unitary sprocket assembly, and further wherein the third sprocket has a plurality of tangs that extend radially from the third inner circumference in a same plane as the third gear teeth extend in an opposite direction.

18. The unitary sprocket assembly of claim 11, wherein each of the first radial support members and first axial support members is comprised of a flat portion and a curved portion.

19. The unitary sprocket assembly of claim 18, wherein the curved portion is in the shape of a curve swept around the central axis.

20. A method of providing a conical shaped bicycle cassette, the method comprising:

providing a large sprocket sub-assembly having one or more large sprockets; and detachably coupling a unitary small sprocket sub-assembly to the large sprocket sub-assembly with a cassette locking screw, the unitary small sprocket sub-assembly having a central axis and including:

a first sprocket having a plurality of outwardly extending first gear teeth, a first inner circumference opposite the first gear teeth, a plurality of first radial support members and a plurality of first axial support members, wherein the plurality of first radial support members are circumferentially offset from the plurality of first axial support members;

a second sprocket having a plurality of outwardly extending second gear teeth, a second inner circumference opposite the second gear teeth that is smaller than the first inner circumference, a plurality of second radial support members and a plurality of second axial support members, wherein the plurality of second radial support members are circumferentially offset from the plurality of second axial support members; and a third sprocket having a plurality of outwardly extending third gear teeth and a third inner circumference opposite the third gear teeth that is greater than the first inner circumference;

wherein the first radial support members extend from the inner circumference in a radial direction toward the central axis, bend toward the second sprocket and couple to the second sprocket at a level of the second inner circumference, and further wherein the first axial support members extend toward the third sprocket in an axial direction parallel to the central axis, bend toward the third sprocket and couple to third inner circumference of the third sprocket.

21. The method of claim 20, wherein each of the plurality of first radial support members and the plurality of first axial support members has one or more machined windows.

22. The method of claim 20, wherein positions of the plurality of first radial support members and the plurality of first axial support members on the first sprocket alternate such that along the first inner circumference each first radial support of the first radial supports is straddled by two of the first axial supports and each first axial support of the first axial supports is straddled by two of the first radial supports.

23. The method of claim 20, wherein a quantity of the first gear teeth is greater than a quantity of the second gear teeth and less than a quantity of the third gear teeth.

24. The method of claim 20, wherein in a direction aligned with the central axis, a profile of both left and right sides of each of the plurality of radial supports and a profile of both left and right sides of each of the plurality of axial supports is curved.

25. The method of claim 20, wherein in a direction aligned with the central axis, a profile of a majority of both left and right sides of each of the plurality of radial supports is straight and a profile of both left and right sides of each of the plurality of axial supports is straight.

26. The method of claim 20, wherein the third sprocket is the largest sprocket of the unitary small sprocket sub-assembly, and further wherein the third sprocket has a plurality of tangs that extend radially from the third inner circumference in a same plane as the third gear teeth extend in an opposite direction.

27. The method of claim 26, wherein the large sprocket sub-assembly comprises a plurality of locking flanges that each have a cutout, the method further comprising sliding each of the tangs is into one of the cutouts before screwing in the cassette locking screw in order to couple the large sprocket sub-assembly to the unitary small sprocket sub-assembly.

28. The method of claim 20, wherein each of the first radial support members and first axial support members is comprised of a flat portion and a curved portion.

29. The method of claim 28, wherein the curved portion is in the shape of a curve swept around the central axis.

* * * * *